(12) United States Patent
Koch, III

(10) Patent No.: US 7,360,066 B2
(45) Date of Patent: *Apr. 15, 2008

(54) BOOLEAN PROCESSOR

(75) Inventor: Kenneth Elmon Koch, III, Mooresville, NC (US)

(73) Assignee: University of North Carolina at Charlotte, Charlotte, NC (US)

( * ) Notice: Subject to any disclaimer, the term of this patent is extended or adjusted under 35 U.S.C. 154(b) by 702 days.

This patent is subject to a terminal disclaimer.

(21) Appl. No.: 10/075,917

(22) Filed: Feb. 13, 2002

(65) Prior Publication Data

US 2002/0184475 A1 Dec. 5, 2002

Related U.S. Application Data

(60) Provisional application No. 60/268,471, filed on Feb. 14, 2001, provisional application No. 60/268,472, filed on Feb. 14, 2001, provisional application No. 60/268,478, filed on Feb. 14, 2001.

(51) Int. Cl.
*G06F 9/305* (2006.01)
*G06F 9/445* (2006.01)

(52) U.S. Cl. ..................... 712/223; 712/217

(58) Field of Classification Search ................ 712/223, 712/227
See application file for complete search history.

(56) References Cited

U.S. PATENT DOCUMENTS 4,792,909 A * 12/1988 Serlet ........................... 716/10
5,385,757 A * 1/1995 Kress ............................ 716/1
5,530,939 A * 6/1996 Mansfield, Jr et al. ..... 707/201
5,682,519 A * 10/1997 Saldanha et al. ............. 716/2
5,805,462 A * 9/1998 Poirot et al. ................. 716/18
5,905,977 A  5/1999 Goubault
6,385,757 B1 * 5/2002 Gupta et al. ................... 716/1
2004/0177235 A1 * 9/2004 Koch ......................... 712/223

OTHER PUBLICATIONS

Miner, A.S. et al., "Efficient Reachability Set Generation and Storage using Decision Diagrams." Department of Computer Science, William and Mary; web page at http://citeseer.isl.psu.edu/cache/papers/cs/26511/http:zSzzSzwww.cs.wm.eduzSz-ciadozSzpubszSz1999ICATPN-MDD.pdf/miner99efficient.pdf.
Posegga, J. et al., "Towards First-Order Deduction Based on Shannon Graphs." Universitat Karlsruhe, Insitut fur Logik, Komplexitat und Deduktionssysteme; web page at http://citeseer.isl.psu.edu.cache/papers/cs/24059/http:zSzzSzwww.sdsc.eduzSz-ludaeschzSzPaperzSzgwai92.pdf/posegga92towards.pdf.

* cited by examiner

*Primary Examiner*—Daniel Pan
(74) *Attorney, Agent, or Firm*—Kilpatrick Stockton LLP

(57) ABSTRACT

A processor including a Boolean logic unit, wherein the Boolean logic unit is operable for performing the short-circuit evaluation of Conjunctive Normal Form Boolean expressions/operations, a plurality of input/output interfaces, wherein the plurality of input/output interfaces are operable for receiving a plurality of compiled Boolean expressions/operations and transmitting a plurality of compiled results, and a plurality of registers. An associated processing method including starting an operation related to a Conjunctive Normal Form Boolean expression, wherein the Boolean expression comprises a conjunct, evaluating the conjunct, and selectively short-circuiting a portion of the Boolean expression.

25 Claims, 21 Drawing Sheets

BOOLEAN PROCESSOR

CROSS-REFERENCE TO RELATED APPLICATIONS

This non-provisional patent application claims the benefit of U.S. Provisional Patent Application Nos. 60/268,471, 60/268,472, and 60/268,478, each filed Feb. 14, 2001.

FIELD OF THE INVENTION

The present invention relates generally to the computing and microelectronics fields. More specifically, the present invention relates to a Boolean-based processor architecture that is capable of the short-circuit evaluation of Conjunctive Normal Form (CNF) Boolean expressions. The Boolean processor of the present invention provides an inexpensive, scalable, and efficient means for computing in environments typically suited for application-specific microprocessors and microcontrollers, such as monitoring and automation environments.

BACKGROUND OF THE INVENTION

A microprocessor is a general-purpose computing architecture, also known as a central processing unit (CPU). The microprocessor includes an arithmetic logic unit (ALU), an accumulator, a plurality of registers, a program counter, a stack pointer, a clock circuit, and a plurality of interrupt circuits. In building a complete computing system, the microprocessor must be supplemented with external components, such as a random-access memory (RAM) and a read-only memory (ROM), an oscillator, a plurality of memory decoders, a plurality of Input/Output (I/O) interfaces (ports), and a plurality of other devices, such as video displays and disk drives. The microprocessor is designed to perform a wide variety of calculations with data and return the results to a user or another machine. The microprocessor achieves this computing power through the use of a sophisticated instruction set that may contain a plurality of instructions for performing arithmetic operations, bit movement operations, memory fetch and store operations, etc. Because of the complexity of the calculations that the microprocessor performs, the programs that control its operation are generally relatively large, requiring the use of mass storage devices to house them. When needed for a specific calculation or task, a program is loaded into the system RAM and executed by the microprocessor.

The primary design factors related to the microprocessor are flexibility and expandability, allowing the microprocessor to handle almost any task. This adaptability has resulted in a relatively large demand for the microprocessor and has enabled manufacturers to mass-produce them, resulting in a relatively inexpensive and disposable product.

Like the microprocessor, a microcontroller is also a general-purpose computing architecture. The microcontroller differs from the microprocessor, however, in that it can operate as a complete, stand-alone computer system. The microcontroller includes all of the components of the microprocessor, in addition to its own RAM, ROM, plurality of counters, and I/O ports. The microcontroller is also relatively flexible and can be used in a plurality of applications, however, the microcontroller is intended for use in a relatively static environment, requiring its programs to change minimally over time. The microcontroller is primarily intended to be used to control the environment within which it operates. The microcontroller is typically used in embedded system applications for monitoring and automation purposes. The microcontroller can be found in, for example, appliances (such as microwave ovens, refrigerators, televisions, VCRs, and stereos), automobiles (such as in engine control systems, diagnostics systems, and climate control systems), environmental control systems (such as in factories, greenhouses, and homes), instrumentation arrays, and aerospace systems.

The microprocessor differs from the microcontroller in their sets of operational codes. The microprocessor has far more operational codes for moving data to and from an external memory than the microcontroller, which may only have a few such operational codes. From an internal bit-handling perspective, the microcontroller has far more internal bit-handling operational codes than the microprocessor, which may only have a few. The architecture of both the microprocessor and the microcontroller are intended for mass use and are designed for flexibility and expandability. Each has the goal of supporting a wide range of applications. While the primary use of the microprocessor is for calculation-intensive computing, the microcontroller is designed to handle smaller calculations and to control its environment.

The short-circuit evaluation of a Boolean expression or operation is simply the abandonment of the remainder of the expression or operation once its value has been determined. If the outcome of the expression or operation can be determined prior to its full evaluation, it makes sense to save processing cycles by avoiding the remaining, unnecessary, conditional tests of the expression or operation. In other words, the short-circuit evaluation of a Boolean expression is a technique that specifies the partial evaluation of the expression involving an AND and an OR operation.

What is needed is a microprocessor and/or a microcontroller that is capable of evaluating complex Boolean expressions that are in Conjunctive Normal Form (CNF). Disjunctive Normal Form (DNF) Boolean expressions can also be incorporated into the architecture of the microprocessor and/or the microcontroller, however, there are inefficiencies associated with the processing of the DNF equivalents of CNF expressions.

A Boolean expression is in DNF if it is expressed as the sum (OR) of products (AND). That is, the Boolean expression B is in DNF if it is written as:

A1 OR A2 OR A3 OR . . . An, where each term Ai is expressed as:

T1 AND T2 AND . . . AND Tm, where each term Ti is either a simple variable, or the negation (NOT) of a simple variable. Each term Ai is referred to as a "minterm". A Boolean expression is in CNF if it is expressed as the product (AND) of sums (OR). That is, the Boolean expression B is in CNF if it is written as:

O1 AND O2 AND O3 AND . . . On, where each term Oi is expressed as:

T1 OR T2 OR . . . OR Tm, where each term Ti is either a simple variable, or the negation (NOT) of a simple variable. Each term Oi is referred to as a "maxterm". The terms "minterm" and "maxterm" can also be referred to as "disjunct" and "conjunct", respectively.

The short-circuit evaluations of a CNF Boolean expression and a DNF Boolean expression are handled differently.

In the case of a CNF expression, short-circuiting can occur if any of the conjuncts evaluates to false. In the following example, (A∨B)∧(C∨D), if either of the conjuncts, (A∨B) or (C∨D), evaluates to false, the expression also evaluates to false. If (A∨B) evaluates to false, the remainder of the expression can be eliminated, thereby saving the time required to evaluate the other conjunct. In contrast to CNF short-circuit evaluation, a DNF expression can be short-circuited if any of the disjuncts evaluates to true. Using the previous example in DNF, (A∧C)∨(A∧D)∨(B∧C)∨(B∧D), if any of the disjuncts, (A∧C), (A∧D), (B∧C), or (B∧D), evaluates to true, the expression also evaluates to true. For example, if (A∧C) evaluates to true, the evaluation of the remaining three disjuncts can be eliminated, since their values are irrelevant to the outcome of the expression.

Thus, the short-circuit evaluation of both CNF and DNF expressions becomes increasingly valuable, in terms of cycle savings, as the complexity of the expressions increases. In large scale monitoring and automation applications, the short-circuit evaluation of both CNF and DNF expressions is essential.

BRIEF SUMMARY OF THE INVENTION

Embodiments of the general-purpose Boolean processor of the present invention incorporate an architecture that is designed to provide optimal performance for computing complex Boolean expressions. The Boolean processor is intended for use in, among other things, monitoring and automation applications. The Boolean processor is built for speed and efficiency via its ability to perform the short-circuit evaluation of Conjunctive Normal Form (CNF) Boolean expressions. The Boolean processor provides enhanced computing performance, in terms of the number of instructions required to perform equivalent operations, to that of other general-purpose architectures.

In one embodiment of the present invention, a processor includes a Boolean logic unit, wherein the Boolean logic unit is operable for performing the short-circuit evaluation of Conjunctive Normal Form Boolean expressions/operations, a plurality of input/output interfaces, wherein the plurality of input/output interfaces are operable for receiving a plurality of compiled Boolean expressions/operations and transmitting a plurality of compiled results, and a plurality of registers.

In another embodiment of the present invention, a processing method includes starting an operation related to a Conjunctive Normal Form Boolean expression, wherein the Boolean expression comprises a conjunct, evaluating the conjunct, and selectively short-circuiting a portion of the Boolean expression.

In a further embodiment of the present invention, a device polling unit for finding new devices, assigning addresses to those devices, polling those devices for their current states, and updating a random-access memory with those states includes a maximum device address electrically-erasable programmable read-only memory, wherein the electrically-erasable programmable read-only memory is operable for storing the highest address of all known devices on a system, wherein the electrically-erasable programmable read-only memory includes an increment line that increments its value by one whenever it is asserted and a plurality of output lines that continuously output its value. The device polling unit also includes an n-bit incrementing register, wherein the n-bit incrementing register is operable for holding an n-bit number representing a current address of a device being polled, wherein the n-bit incrementing register includes a reset line that sets the register to 'zero' whenever it is asserted, and wherein the n-bit incrementing register further includes an increment line and a plurality of output lines that continuously output its value to an AND unit and a current address encoder. The device polling unit operates in a continuous loop after it is started.

In a further embodiment of the present invention, a device interface unit for listening for new device seek, new address, state enable, and control line assertions and determining whether or not there is work to do as a result of such assertions includes a new device electrically-erasable programmable read-only memory, wherein the new device electrically-erasable programmable read-only memory includes an n-bit store that is initially set to 'one', and wherein, when a new device seek line is asserted, the n-bit store asserts a new device found line. The device interface unit also includes an address decoder, wherein, if the n-bit store is set, it allows an address passed on a new address line to be placed in an n-bit address electrically-erasable programmable read-only memory and the n-bit store to be cleared. The device interface unit further includes a control word decoder, wherein the control word decoder is operable for reading serial bits off of a control line, and wherein, if an address matches the address in the n-bit address electrically-erasable programmable read-only memory, a plurality of control bits output to a device controller to change its state. The device interface unit further includes an address and state encoder, wherein the address and state encoder is operable for reading bits in parallel that represent the address and state of the device and serially outputs the bits to a receiver.

DETAILED DESCRIPTION OF THE INVENTION

Figure 1:
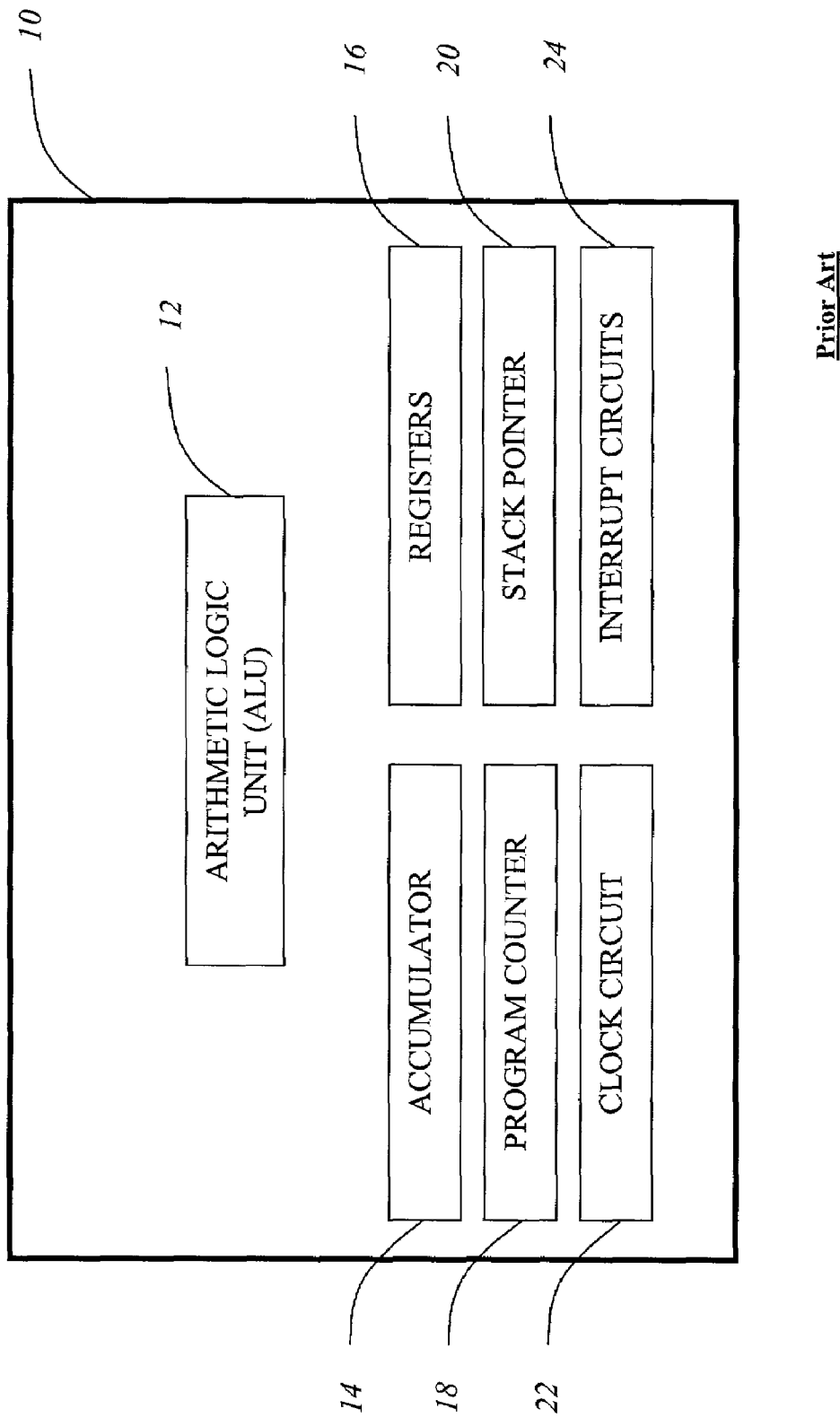
FIG. 1 is a schematic block diagram of a conventional microprocessor.

A microprocessor is a general-purpose computing architecture, also known as a central processing unit (CPU). Referring to FIG. 1, the microprocessor 10 includes an arithmetic logic unit (ALU) 12, an accumulator 14, a plurality of registers 16, a program counter 18, a stack pointer 20, a clock circuit 22, and a plurality of interrupt circuits 24. In building a complete computing system, the microprocessor 10 must be supplemented with external components, such as a random-access memory (RAM) and a read-only memory (ROM), an oscillator, a plurality of memory decoders, a plurality of Input/Output (I/O) interfaces (ports), and a plurality of other devices, such as video displays and disk drives. The microprocessor 10 is designed to perform a wide variety of calculations with data and return the results to a user or another machine. The microprocessor 10 achieves this computing power through the use of a sophisticated instruction set that may contain a plurality of instructions for performing arithmetic operations, bit movement operations, memory fetch and store operations, etc. Because of the complexity of the calculations that the microprocessor 10 performs, the programs that control its operation are generally relatively large, requiring the use of mass storage devices to house them. When needed for a specific calculation or task, a program is loaded into the system RAM and executed by the microprocessor 10.

The primary design factors related to the microprocessor 10 are flexibility and expandability, allowing the microprocessor 10 to handle almost any task. This adaptability has resulted in a relatively large demand for the microprocessor 10 and has enabled manufacturers to mass-produce them, resulting in a relatively inexpensive and disposable product.

Figure 2:
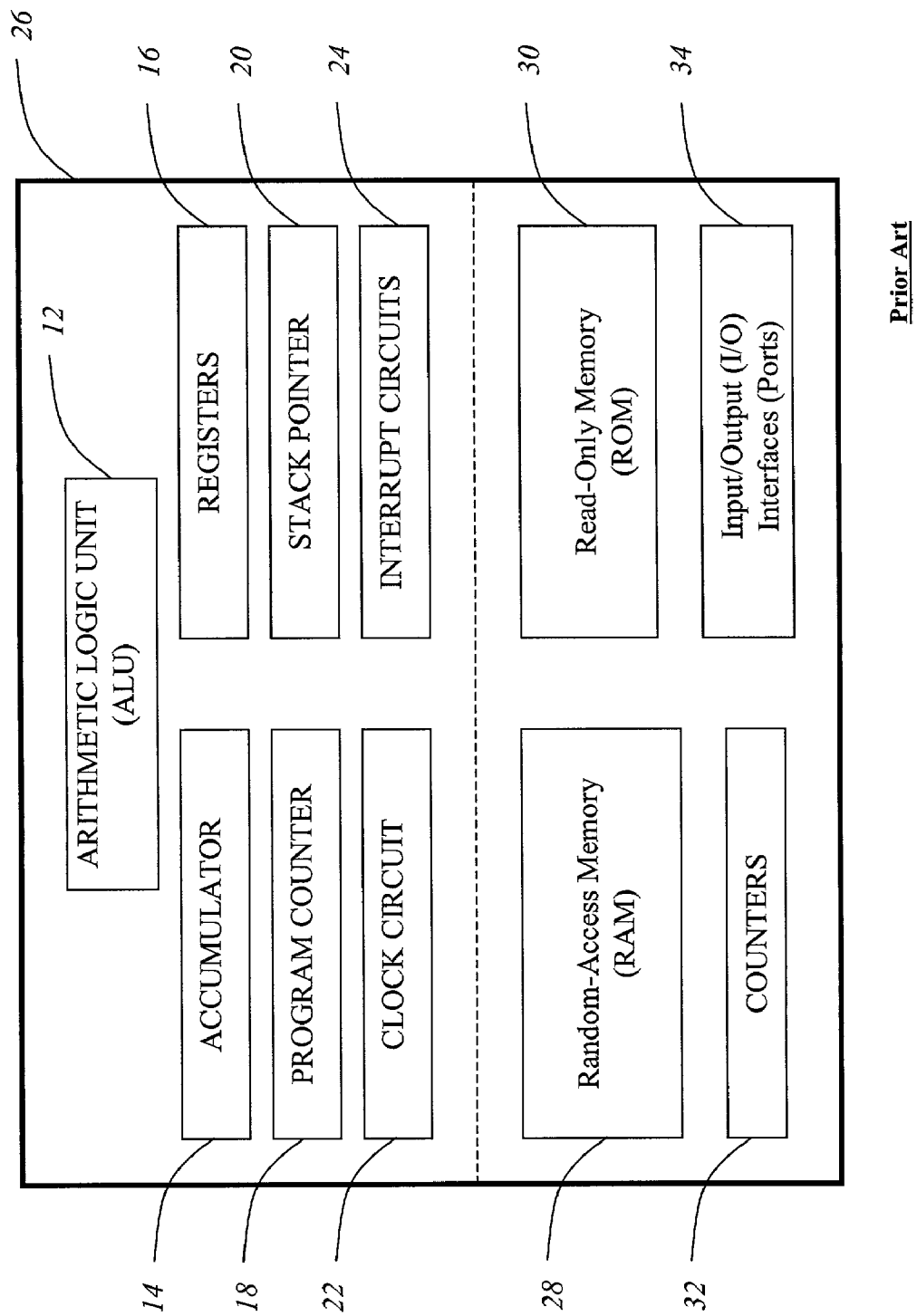
FIG. 2 is a schematic block diagram of a conventional microcontroller.

Like the microprocessor 10, a microcontroller is also a general-purpose computing architecture. The microcontroller differs from the microprocessor 10, however, in that it can operate as a complete, stand-alone computer system. Referring to FIG. 2, the microcontroller 26 includes all of the components of the microprocessor 10 (FIG. 1), in addition to its own RAM 28, ROM 30, plurality of counters 32, and I/O ports 34. The microcontroller 26 is also relatively flexible and can be used in a plurality of applications, however, the microcontroller 26 is intended for use in a relatively static environment, requiring its programs to change minimally over time. The microcontroller 26 is primarily intended to be used to control the environment within which it operates. The microcontroller 26 is typically used in embedded system applications for monitoring and automation purposes. The microcontroller 26 can be found in, for example, appliances (such as microwave ovens, refrigerators, televisions, VCRs, and stereos), automobiles (such as in engine control systems, diagnostics systems, and climate control systems), environmental control systems (such as in factories, greenhouses, and homes), instrumentation arrays, and aerospace systems.

The microprocessor 10 differs from the microcontroller 26 in their sets of operational codes. The microprocessor 10 has far more operational codes for moving data to and from an external memory than the microcontroller 26, which may only have a few such operational codes. From an internal bit-handling perspective, the microcontroller 26 has far more internal bit-handling operational codes than the microprocessor 10, which may only have a few. The architecture of both the microprocessor 10 and the microcontroller 26 are intended for mass use and are designed for flexibility and expandability. Each has the goal of supporting a wide range of applications. While the primary use of the microprocessor 10 is for calculation-intensive computing, the microcontroller 26 is designed to handle smaller calculations and to control its environment.

The short-circuit evaluation of a Boolean expression or operation is simply the abandonment of the remainder of the expression or operation once its value has been determined. If the outcome of the expression or operation can be determined prior to its full evaluation, it makes sense to save processing cycles by avoiding the remaining, unnecessary, conditional tests of the expression or operation. In other words, the short-circuit evaluation of a Boolean expression is a technique that specifies the partial evaluation of the expression involving an AND and/or an OR operation, or a plurality of each.

What is needed is a microprocessor and/or a microcontroller that is capable of evaluating complex Boolean expressions that are in Conjunctive Normal Form (CNF). Disjunctive Normal Form (DNF) Boolean expressions can also be incorporated into the architecture of the microprocessor and/or the microcontroller, however, there are inefficiencies associated with the processing of the DNF equivalents of CNF expressions.

A Boolean expression is in DNF if it is expressed as the sum (OR) of products (AND). That is, the Boolean expression B is in DNF if it is written as:

$$A1 \text{ OR } A2 \text{ OR } A3 \text{ OR } \ldots An, \quad (1)$$

where each term Ai is expressed as:

$$T1 \text{ AND } T2 \text{ AND } \ldots \text{ AND } Tm, \quad (2)$$

where each term Ti is either a simple variable, or the negation (NOT) of a simple variable. Each term Ai is referred to as a "minterm". A Boolean expression is in CNF if it is expressed as the product (AND) of sums (OR). That is, the Boolean expression B is in CNF if it is written as:

$$O1 \text{ AND } O2 \text{ AND } O3 \text{ AND } \ldots On, \quad (3)$$

where each term Oi is expressed as:

$$T1 \text{ OR } T2 \text{ OR } \ldots \text{ OR } Tm, \quad (4)$$

where each term Ti is either a simple variable, or the negation (NOT) of a simple variable. Each term Oi is referred to as a "maxterm". The terms "minterm" and "maxterm" can also be referred to as "disjunct" and "conjunct", respectively.

The short-circuit evaluations of a CNF Boolean expression and a DNF Boolean expression are handled differently. In the case of a CNF expression, short-circuiting can occur if any of the conjuncts evaluates to false. In the following example, $$(A \lor B) \land (C \lor D), \quad (5)$$

if either of the conjuncts, $(A \lor B)$ or $(C \lor D)$, evaluates to false, the expression also evaluates to false. If $(A \lor B)$ evaluates to false, the remainder of the expression can be eliminated, thereby saving the time required to evaluate the other conjunct. In contrast to CNF short-circuit evaluation, a DNF expression can be short-circuited if any of the disjuncts evaluates to true. Using the previous example in DNF, $$(A \land C) \lor (A \land D) \lor (B \land C) \lor (B \land D), \quad (6)$$

if any of the disjuncts, $(A \land C)$, $(A \land D)$, $(B \land C)$, or $(B \land D)$, evaluates to true, the expression also evaluates to true. For example, if $(A \land C)$ evaluates to true, the evaluation of the remaining three disjuncts can be eliminated, since their values are irrelevant to the outcome of the expression.

Thus, the short-circuit evaluation of both CNF and DNF expressions becomes increasingly valuable, in terms of cycle savings, as the complexity of the expressions increases. In large scale monitoring and automation applications, the short-circuit evaluation of both CNF and DNF expressions is essential.

Figure 3:
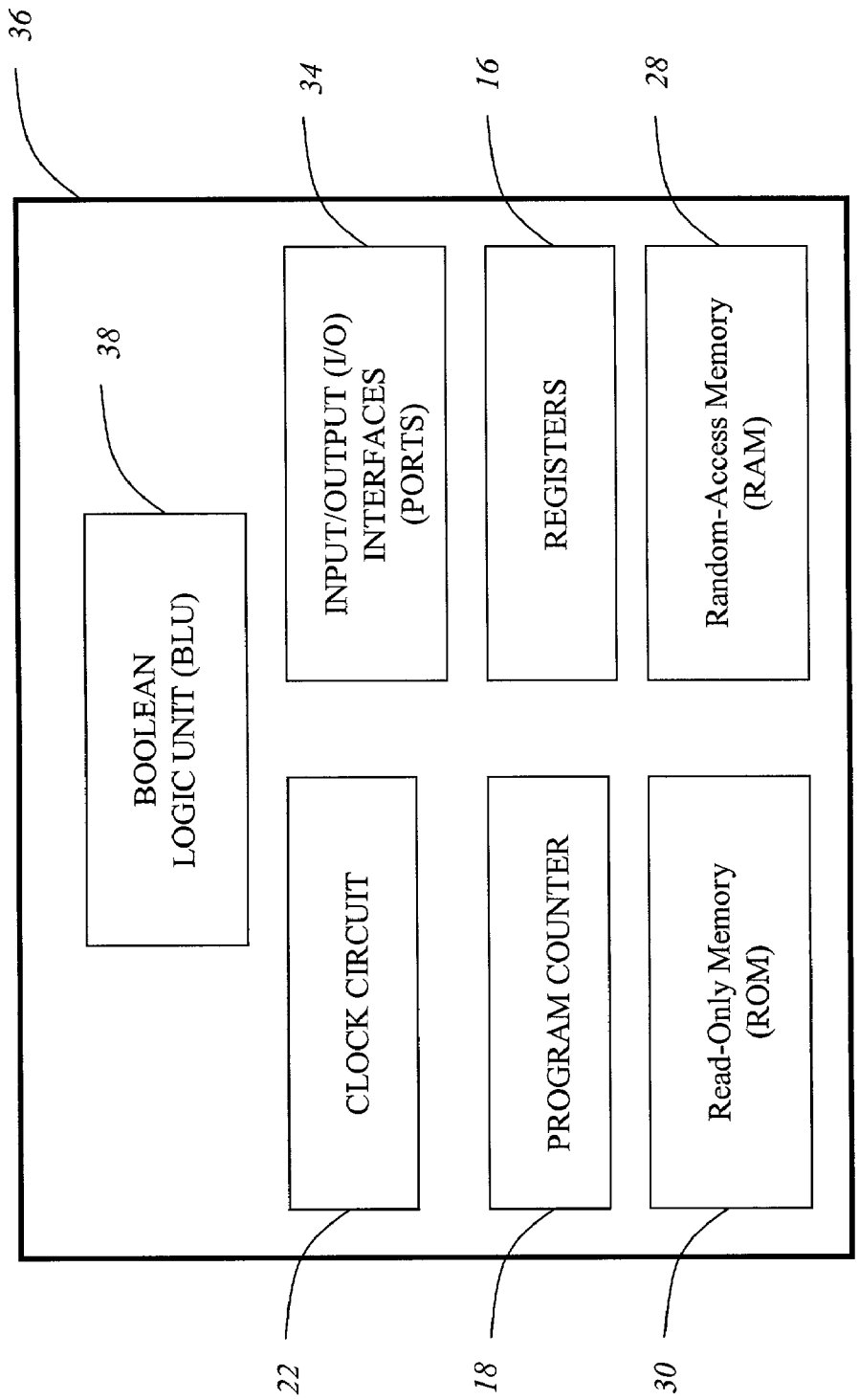
FIG. 3 is a schematic block diagram of one embodiment of the Boolean processor of the present invention.

Referring to FIG. 3, in one embodiment of the present invention, the architecture of the Boolean processor 36 can best be described as that of a microcontroller, at least functionally. The inputs of the microcontroller are compiled Boolean operations, or tests, and the outputs of the microcontroller are compiled result operations that are executed in conjunction with the results of the tests. The Boolean processor 36 includes a clock circuit 22, a program counter 18, a plurality of Input/Output (I/O) interfaces (ports) 34, a plurality of registers 16, a random-access memory (RAM) 28, and a read-only memory (ROM) 30. The Boolean processor 36 differs, however, from a conventional microcontroller in that the Boolean processor 36 does not contain an accumulator 14 (FIGS. 1 and 2), a plurality of counters (other than the program counter 18), a plurality of interrupt circuits 24 (FIGS. 1 and 2), or a stack pointer 20 (FIGS. 1 and 2). Additionally, in lieu of an arithmetic logic unit (ALU) 12 (FIGS. 1 and 2), the Boolean processor 36 includes a Boolean logic unit (BLU) 38. In terms of its size, speed, and functionality, the architecture of the Boolean Processor 36 is designed to be inexpensive, scalable, and efficient. The Boolean processor 36 achieves these benefits through a simple design that is optimized for performing the short-circuit evaluation of complex Conjunctive Normal Form (CNF) Boolean expressions.

Figure 4:
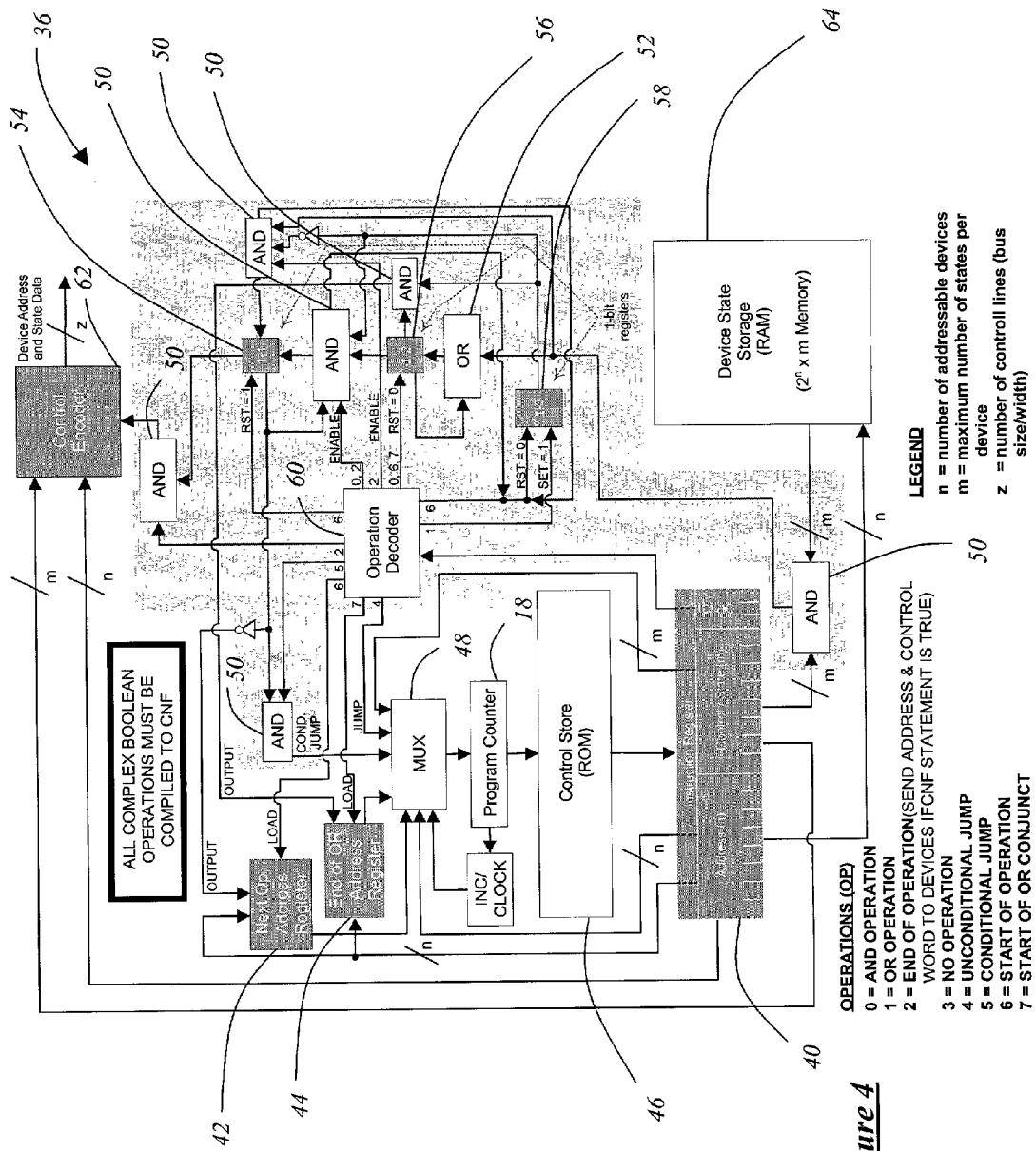
FIG. 4 is a schematic diagram of one embodiment of the architecture of the Boolean processor of the present invention.

The architecture of the Boolean processor 36 is illustrated in FIG. 4. For the purposes of describing the architecture of the Boolean processor 36, 8-bit device addressing and 8-bit control words are used. This results in the architecture of the Boolean processor 36 supporting 256 devices, each device having 256 possible states. Optionally, the architecture of the Boolean processor 36 can be scaled to accommodate $2^n$ devices, each device having $2^m$ possible states, where n and m are the number of device address bits and the number of possible states for each device, respectively. The defining feature of the architecture of the Boolean processor 36 is its set of registers, or lack thereof. In contrast to conventional microprocessors and microcontrollers, which can have a plurality of registers (typically from 8 to 64 bits wide), the Boolean processor 36 has only six registers. Of the six registers, the instruction register 40, the next operation register 42, and the end of OR address register 44 are the only multi-bit registers. The remaining three registers are single-bit registers, which hold AND truth states, OR truth states, and an indicator for conjuncts containing OR clauses.

The Boolean processor 36 includes the instruction register 40, which is an n+m+3-bit wide register containing an n-bit address, an m-bit control/state word, and a 3-bit operational code. Using 8-bit device addressing and 8-bit control words, the instruction register 40 is 19-bits wide. The Boolean processor 36 also includes a control store (ROM) 46, which is used to hold a compiled micro-program, including (n+m+3)-bit instructions. The Boolean processor 36 further includes the program counter 18, which is used for fetching the next instruction from the control store 46. The Boolean processor 36 further includes a memory (MUX) 48, which is used to configure the program counter 18 for normal operation, conditional jump operation, unconditional jump operation, and Boolean short-circuit operation. Six AND gates 50 and one OR gate 52 are used to pass operation results and a plurality of signals that are operational code dependent. A 1-bit AND register 54 is used to roll up the results of the conjuncts. The default value of the 1-bit AND register 54 is one and it initializes to a value of one after a start of operational code. The 1-bit AND register 54 remains at a value of one if all of the conjuncts in the Boolean expression being evaluated are true. If this bit is set to zero at any time during the evaluation, the entire CNF operation is false. In such a case, the remainder of the operation may be short-circuited and the evaluation of the next operation can begin. A 1-bit OR register 56 is used to roll up the results of all of the individual conjuncts. It initializes to a value of zero and remains in that state until a state in a conjunct evaluates to one. A 1-bit OR conjunct register 58 is used to indicate that the evaluation of a conjunct containing OR clauses has begun. It initializes to a value of zero and remains in that state until an OR operation sets its value to one. In the event that the 1-bit OR conjunct register 58 is set to one and the 1-bit OR register 56 is set to one, the entire conjunct evaluates to true and short-circuits to the start of the next conjunct. The Boolean processor 36 further includes an operation decoder 60, which deciphers each operational code and controls the units that are dependent upon each operational code. The functions of the operation decoder 60 by operational code include: Boolean AND (Op Code 0), Boolean OR (Op Code 1), End of Operation (Op Code 2), No Operation (Op Code 3), Unconditional Jump (Op Code 4), Conditional Jump (Op Code 5), Start of Operation (Op Code 6), and Start of Conjunct (Op Code 7). A control encoder 62 accepts n+m bits in parallel (representing a device address and control word) and outputs them across a device bus (control lines) either serially or in parallel, depending upon the architecture of the given device bus. The next operation address register 42 stores the address used for Boolean short-circuiting. Short-circuiting occurs as soon as a conjunct evaluates to false. In such a case, the address is the address of the next operation. The end of OR address register 44 stores the address of the instruction immediately following a conjunct containing OR clauses. It is used for the short-circuiting of conjuncts that contain OR clauses. The Boolean processor 36 further includes a device state storage (RAM) 64, which is responsible for storing the states of the devices that the Boolean processor 36 monitors and/or controls. It has $2^n$ addresses, each of which are m-bits wide, where n is the address width and m is the control state word width, in bits.

The Boolean processor 36 evaluates micro-programs and controls its environment based upon the results of the above-described evaluations. The micro-programs define the actions to be taken by devices in the event that given Boolean tests evaluate to true. The Boolean processor 36 works on the principle that the devices will be controlled based upon their states and the states of other devices, or after some period of time has elapsed. In order to evaluate a micro-program, conditional tests must be compiled into CNF.

The Boolean processor 36 performs eight functions, as specified by operational code. Op Code 0—(Boolean AND) enables the AND gate 50 that loads the AND register 54 in the event that the conditional state of the device at the address in the instruction register 40 equals the state being tested in the instruction register 40. Op Code 1—(Boolean OR) sets the value of the OR conjunct register 58 to one, which enables short-circuiting within a conjunct containing OR clauses. Op Code 2—(End of Operation) enables the AND gate 50 that AND's the value of the OR register 56 with the value of the AND register 54. If the AND register 54 evaluates to a value of one, the control encoder 62 is enabled and the address and control word specified in the end of operation code is sent to the proper device. Op Code 3—(No Operation) does nothing. Op Code 4—(Unconditional Jump) allows the MUX 48 to receive an address from an address portion of the instruction register 40 and causes an immediate jump to the instruction at that address. Op Code 5—(Conditional Jump) provides that if the AND register 54 has a value of one, the test condition is met and the MUX 48 is enabled to receive the "jump to" address from the address portion of the instruction register 40. Op Code 6—(Start of Operation) provides the address of the end of operation line for the current operation. This address is used to short-circuit the expression and keep the Boolean processor 36 from having to evaluate the entire CNF expression in the event that one of the conjuncts evaluates to zero. In addition to loading the end of operation address, this operation also sets the AND register 54 to one and the OR register 56 to zero. Op Code 7—(Start of OR Conjunct) provides the address of the line immediately following the conjunct. This address is used to provide short-circuiting functionality within a given conjunct in the event that one of the conjunct's terms evaluates to one.

The evaluation of a CNF expression begins with Start of Operation (Op Code 6) and proceeds to the evaluation of a conjunct. A conjunct may be either a stand-alone term (evaluated as an AND operation) or a conjunct containing OR clauses. In the latter case, each term of the conjunct is evaluated as part of an OR operation (Op Code 1). Each of these operations represents a test to determine if the state of a given device is equal to the state value specified in the corresponding AND or OR instruction. If the term evaluates to true, the OR-bit is set to a value of one. Otherwise, the OR-bit is set to a value of zero. In the case of a stand-alone term, this value automatically rolls up to the AND register 54. In conjuncts containing OR clauses, the result of each OR operation is OR'ed with the current value of the OR register 56. This ensures that a true term anywhere in the conjunct produces a final value of true for the entire conjunct evaluation. In the event that the OR register 56 has a value of one and the OR conjunct register 58 is set to one, the conjunct will evaluate to true and may be short-circuited to the next conjunct. Next, the Boolean processor 36 prepares for subsequent conjuncts (if any additional conjuncts exist). At this point, an AND operation (Op Code 0) joins the conjuncts and the value of the OR register 56 is rolled up to the AND register 54 by having the value of the OR register 56 AND'ed with the value of the AND register 54. In the event that the OR-bit has a value of zero when the AND operation is processed, the AND-bit will change to a value of zero. Otherwise, the AND-bit's value will remain at one. If the AND-bit has a value of one, the next conjunct is evaluated. If the AND-bit has a value of zero, the final value of the CNF expression is false, regardless of the evaluation of any additional conjuncts. At this point, the remainder of the expression may be short-circuited and the next CNF expression can be evaluated.

Preferably, the Boolean processor 36 requires that functions be compiled in CNF. A micro-code compiler builds the micro-instructions such that they follow a CNF logic. The logic statements for Boolean processor programs are nothing more than IF-THEN-ELSE statements. For example: IF (Device A has State Ax), THEN (Set Device B to State By), ELSE (Set Device C to State Cz). The logic of the IF expression must be compiled into CNF. The expression must also be expanded into a set of expressions AND'ed together, and AND'ed with a pre-set value of TRUE. For the CNF operation, the pre-set value of TRUE is the initial value of the AND register 54 at the start of each logical IF operation. The above IF-THEN-ELSE statement would result in the following micro-code logic: [(Device A has State Ax)∧ TRUE]; if the AND statement is TRUE, then (SET Device B to State By); and if the AND statement is FALSE, then (SET Device C to State Cz).

The following are examples of how some common operations would be compiled to work with the architecture of the Boolean processor 36. It should be noted that the Start of Operation Instruction (Op Code 6), as well as the Start of Conjunct Instruction (Op Code 7), have been omitted since ROM addresses are not listed in the examples. The notation in the following examples is of the form: DevX=Y, where X represents the device address and Y represents the current state of the device.

EXAMPLE 1

If (Dev1=8 or Dev2=0) and (Dev3=10 or Dev2=0) and (Dev4=1 or Dev2=0) then Dev9=20

| | Micro-code | | | |
|---|---|---|---|---|
| Sequence # | Instruction | Register | Value | Operation |
| 1 | 00000001 | 00001000 | 001 | OR |
| 2 | 00000010 | 00000000 | 001 | OR |

-continued

| | | Micro-code | | |
|---|---|---|---|---|
| Sequence # | Instruction | Register | Value | Operation |
| 3 | 00000000 | 00000000 | 000 | AND |
| 4 | 00000011 | 00001010 | 001 | OR |
| 5 | 00000010 | 00000000 | 001 | OR |
| 6 | 00000000 | 00000000 | 000 | AND |
| 7 | 00000100 | 00000001 | 001 | OR |
| 8 | 00000010 | 00000000 | 001 | OR |
| 9 | 00000000 | 00000000 | 000 | AND |
| 10 | 00001001 | 00010100 | 010 | End of Operation |

EXAMPLE 2

If Dev7=22 goto 200

Else goto 100

| | | Micro-code | | |
|---|---|---|---|---|
| Sequence # | Instruction | Register | Value | Operation |
| 1 | 00000111 | 00010110 | 001 | OR |
| 2 | 00000000 | 00000000 | 000 | AND |
| 3 | 00000000 | 11001000 | 101 | Conditional Jump |
| 4 | 00000000 | 01100100 | 100 | Unconditional Jump |

A distinct characteristic of the Boolean processor 36 is the type of expressions it is designed to evaluate; namely expressions in CNF. Optionally, using the same single-bit register design, a DNF-based architecture can also be implemented. However, the architecture of the Boolean processor 36 focuses on CNF, providing the fastest and most scalable design.

Upon initial inspection of the two forms, CNF and DNF, an individual might be inclined to believe that the short-circuit evaluation of DNF expressions has benefits over short-circuited CNF expressions because the terms are OR'ed together and a positive result for any of the terms results in a completed evaluation. The same argument, in the false case, can be made for CNF evaluations. If any of the terms results in a false value, the entire evaluation is complete with a value of false. Additionally, CNF eliminates repeating terms, as shown in the following examples.

EXAMPLE 3

Conjunctive Normal Form

If Dev2=0 and (Dev1=8 or Dev3=10 or Dev4=1) then Dev9=20

| | | Micro-code | | |
|---|---|---|---|---|
| Sequence # | Instruction | Register | Value | Operation |
| 1 | 00000010 | 00000000 | 000 | AND |
| 2 | 00000001 | 00001000 | 001 | OR |
| 3 | 00000011 | 00001010 | 001 | OR |
| 4 | 00000100 | 00000001 | 001 | OR |
| 5 | 00001001 | 00010100 | 010 | End of Operation |

EXAMPLE 4

Disjunctive Normal Form

If (Dev2=0 and Dev1=8) or (Dev2=0 and Dev3=10) or (Dev2=0 and Dev4=1) then Dev9=20

| | | Micro-code | | |
|---|---|---|---|---|
| Sequence # | Instruction | Register | Value | Operation |
| 1 | 00000010 | 00000000 | 000 | AND |
| 2 | 00000001 | 00001000 | 000 | AND |
| 3 | 00000000 | 00000000 | 001 | OR |
| 4 | 00000010 | 00000000 | 000 | AND |
| 5 | 00000011 | 00001010 | 000 | AND |
| 6 | 00000000 | 00000000 | 001 | OR |
| 7 | 00000010 | 00000000 | 000 | AND |
| 8 | 00000100 | 00000001 | 000 | AND |
| 9 | 00000000 | 00000000 | 001 | OR |
| 10 | 00001001 | 00010100 | 010 | End of Operation |

Notice, in the examples, that the testing of Dev2 is a single conjunct in the CNF expression and repeated in every disjunct in the DNF expression. This type of term is important as the outcomes of both the CNF and DNF expressions are almost fully dependent upon their values. These terms are referred to herein as "control states" or "control devices". Without a positive evaluation of a control state, any Boolean expression, whether in CNF or DNF, will evaluate to false. In the case of CNF, the false evaluation of a control state enables short-circuiting, and is what provides CNF with its advantage over DNF.

In the previous examples, CNF provides a savings of five instructions over DNF. DNF, however, has an advantage over CNF for a very small number of non-control, or "other" states (one or two). As the number of terms (both control and "other") grows, however, the short-circuiting of CNF expressions becomes a much more efficient means of evaluation.

Two types of short-circuiting exist in CNF and DNF operations, inter-term short-circuiting and intra-term short-circuiting. Inter-term short-circuiting causes the evaluation of an entire expression to evaluate to true, in the case of DNF, or false, in the case of CNF, if any term evaluates to true or false, respectively. Intra-term short-circuiting causes the evaluation of a conjunct or disjunct to terminate without full evaluation. In this instance, a CNF term, or conjunct, will evaluate to true if any of its sub-terms are true, while a DNF term, or disjunct, will evaluate to false if any of its sub-terms are false. Consider the following statements:

CNF: If (A or B) and (C or D) then E, (7)

DNF: If (A and B) or (C and D) then E. (8)

In the CNF statement, if A evaluates to true, the entire conjunct A or B evaluates to true. As a result, the evaluation of B is unnecessary and can be avoided using intra-term short-circuit evaluation. From an inter-term perspective, if the conjunct A or B evaluates to false, the entire CNF expression evaluates to false, making the evaluation of the conjunct C or D superfluous. In the case of DNF, both inter and intra-term short-circuit evaluation work similarly to that of CNF, except that the term values for DNF are the converse of those for CNF. It should be noted that the Boolean processor 36 performs both inter and intra-term short-circuit evaluations, thereby providing maximum efficiency in processing expressions.

In examining the inter-term short-circuit evaluation of both CNF and DNF expressions, the following equations can be used to characterize the behavior of each:

$$\text{Avg. CNF Instructions} = ((ICS*CS)+(IOS*OS))*PCSD+(ICS*CS)*(1-PCSD)*FCSD, \quad (9)$$

$$\text{Avg. DNF Instructions} = ((ICS*CS)+IOS)*OS*(PCSD*POSD+(1-PCSD)), \quad (10)$$

where: ICS=number of processor instructions required to process a control state; CS=number of control states; OS=other, or non-control, states; IOS=number of processor instructions required to process an "other" state; PCSD=positive control state distribution, the probability that all control states evaluate to true (e.g., a PCSD of 0.5 means that all of the control states evaluate to true in fifty percent of the expression evaluations); FCSD=false control state distribution, in the event that the control states evaluate to false, this number represents which of the control states caused the failure (e.g., a failure among 10 control states with an FCSD of 0.7 means the $7^{th}$ control state evaluated to false); POSD=positive "other" state distribution, the position within the expression that an "other" state evaluates to true (e.g., a POSD of 0.5 means the $5^{th}$ term of 10 evaluates to true).

The following charts represent the results of varying the number of control states and "other" states in the above-referenced equations. It should be noted that all control states are evaluated as soon as possible (i.e. moved as far left in the expression as possible). In this manner, the control states are the first conjuncts in CNF equations and the first terms in each disjunct of DNF equations. Additionally, in the case of DNF equations, each "other" state is combined with the control states to form a disjunct. This results in an equal number of "other" states and disjuncts. Data is generated using a CNFDNF emulation program and complementary CNF and DNF expression classes. A fixed number of control states is entered for each run of the program. The program then varies the number of "other" states from zero to one-thousand, for example. At each step, a random POSD (between 0 and 1) is used and averaged over one-million iterations.

Figure 5:
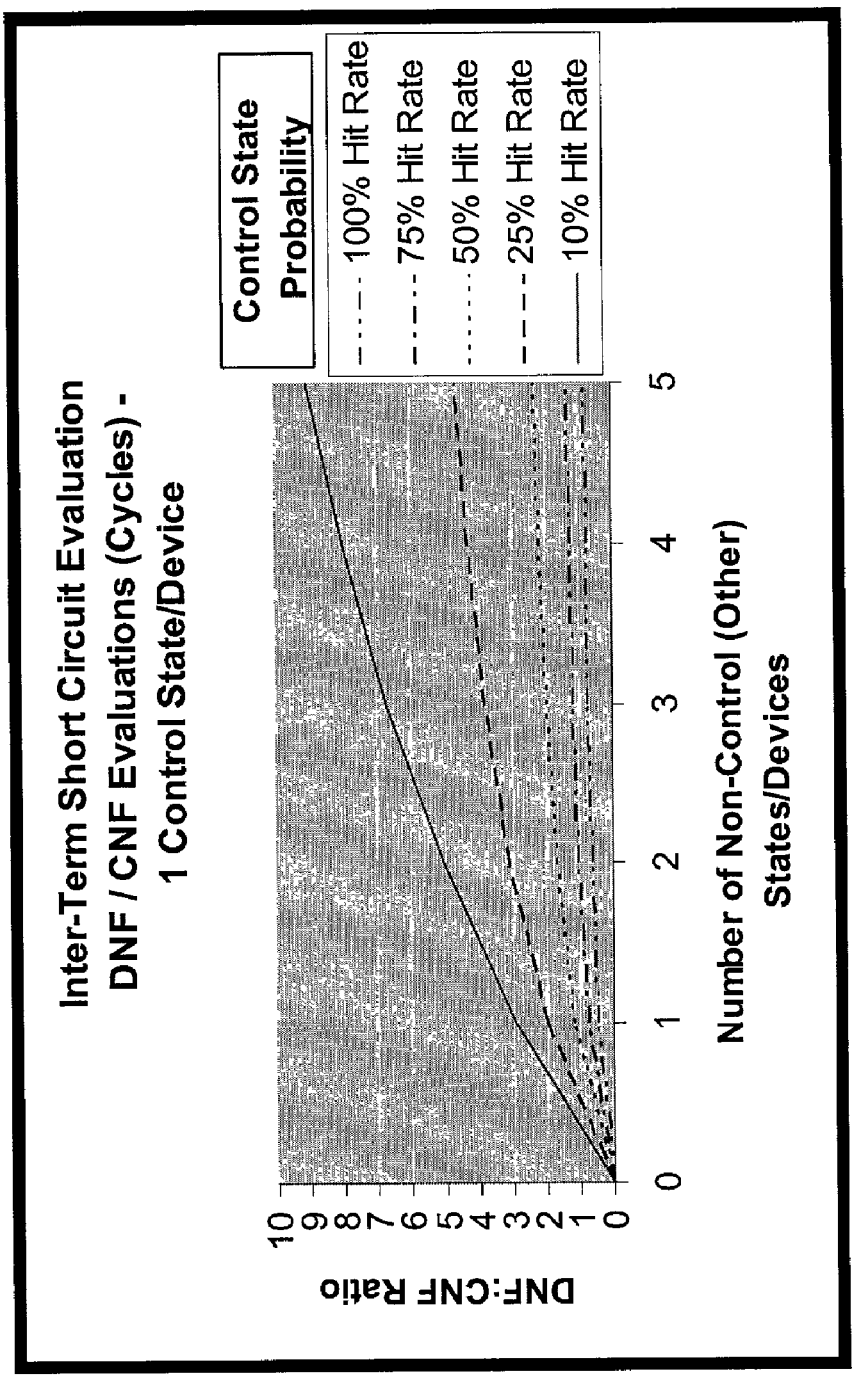
FIG. 5 is a graph of a DNF/CNF ratio using inter-term short-circuit evaluation, with 1 control state and a small number of "other" states.
Figure 6:
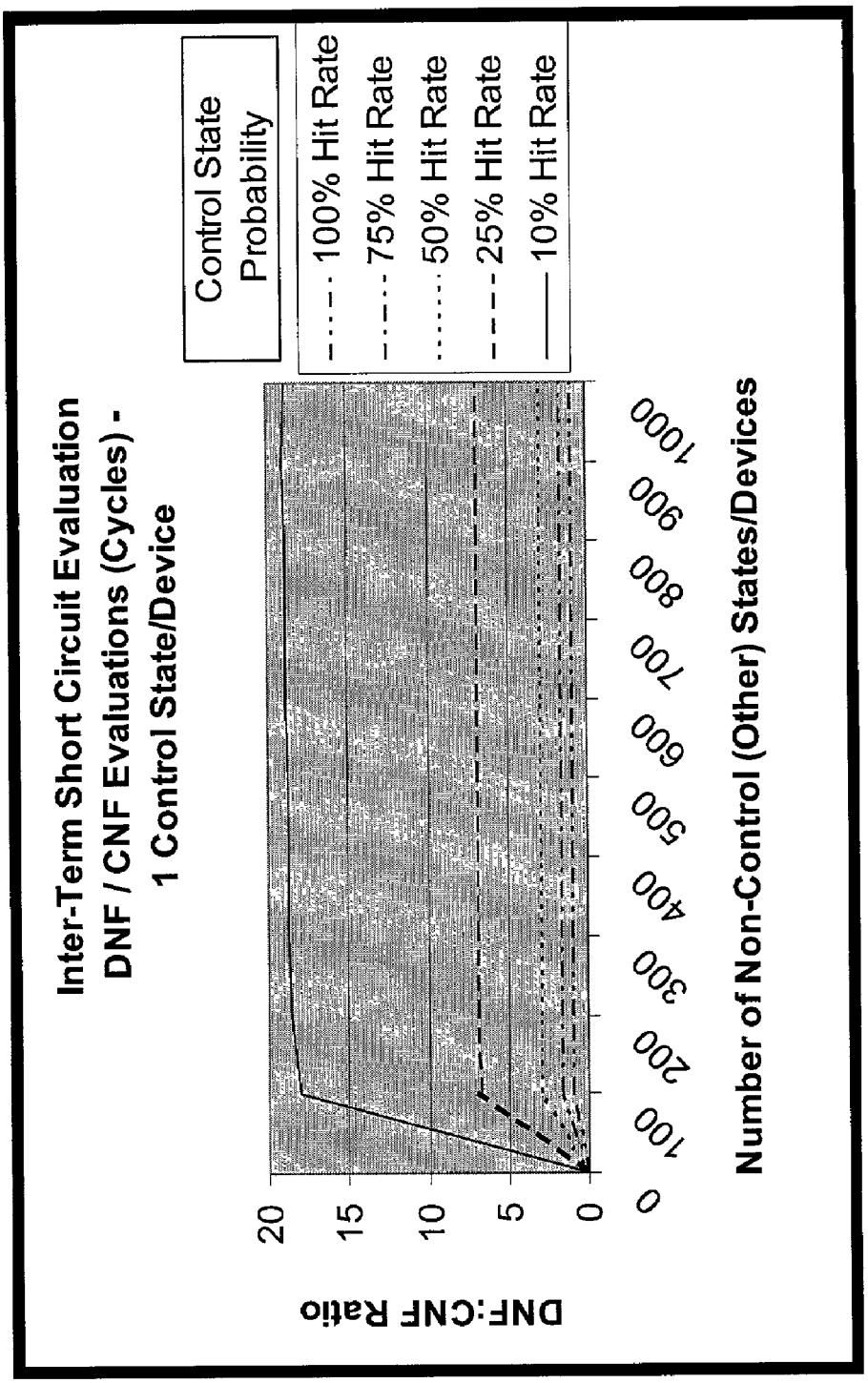
FIG. 6 is a graph of a DNF/CNF ratio using inter-term short-circuit evaluation, with 1 control state and a large number of "other" states.
Figure 7:
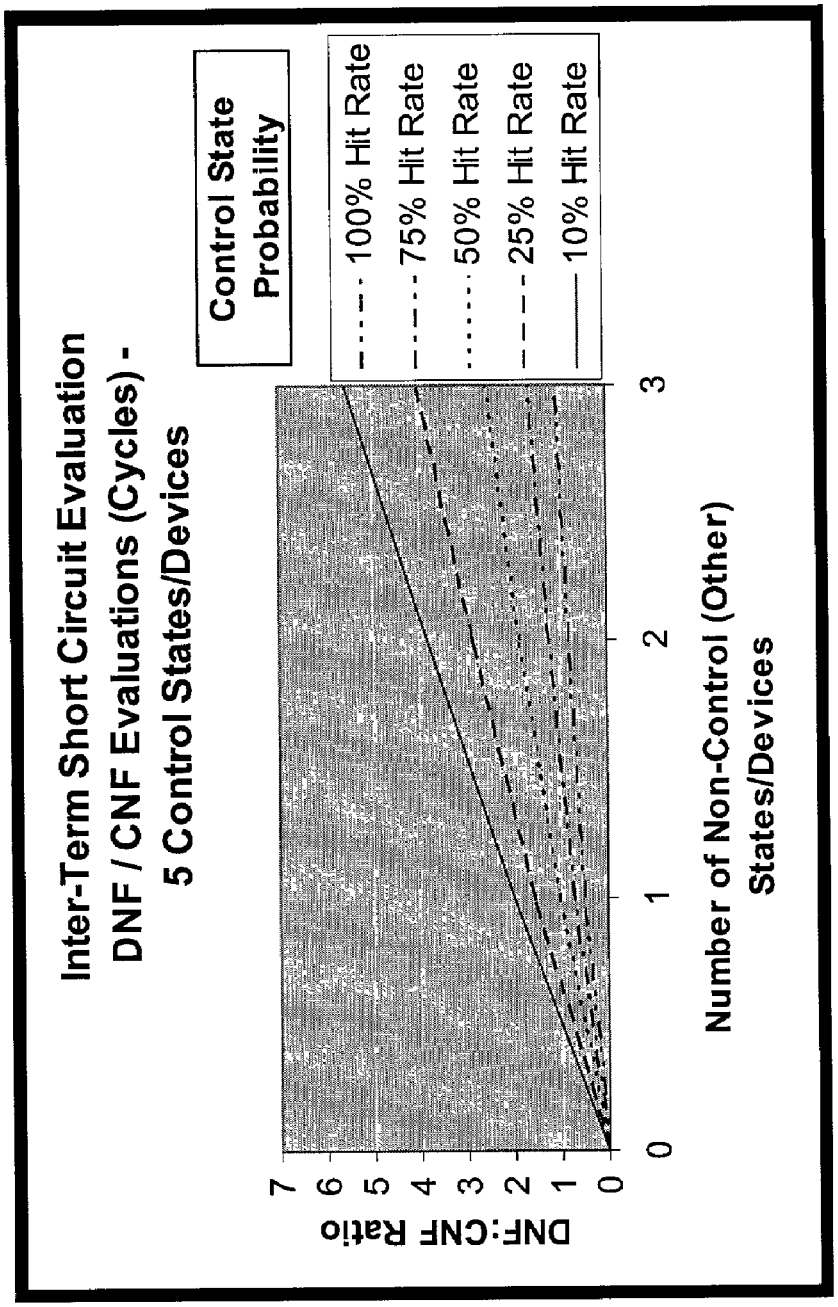
FIG. 7 is a graph of a DNF/CNF ratio using inter-term short-circuit evaluation, with 5 control states and a small number of "other" states.
Figure 8:
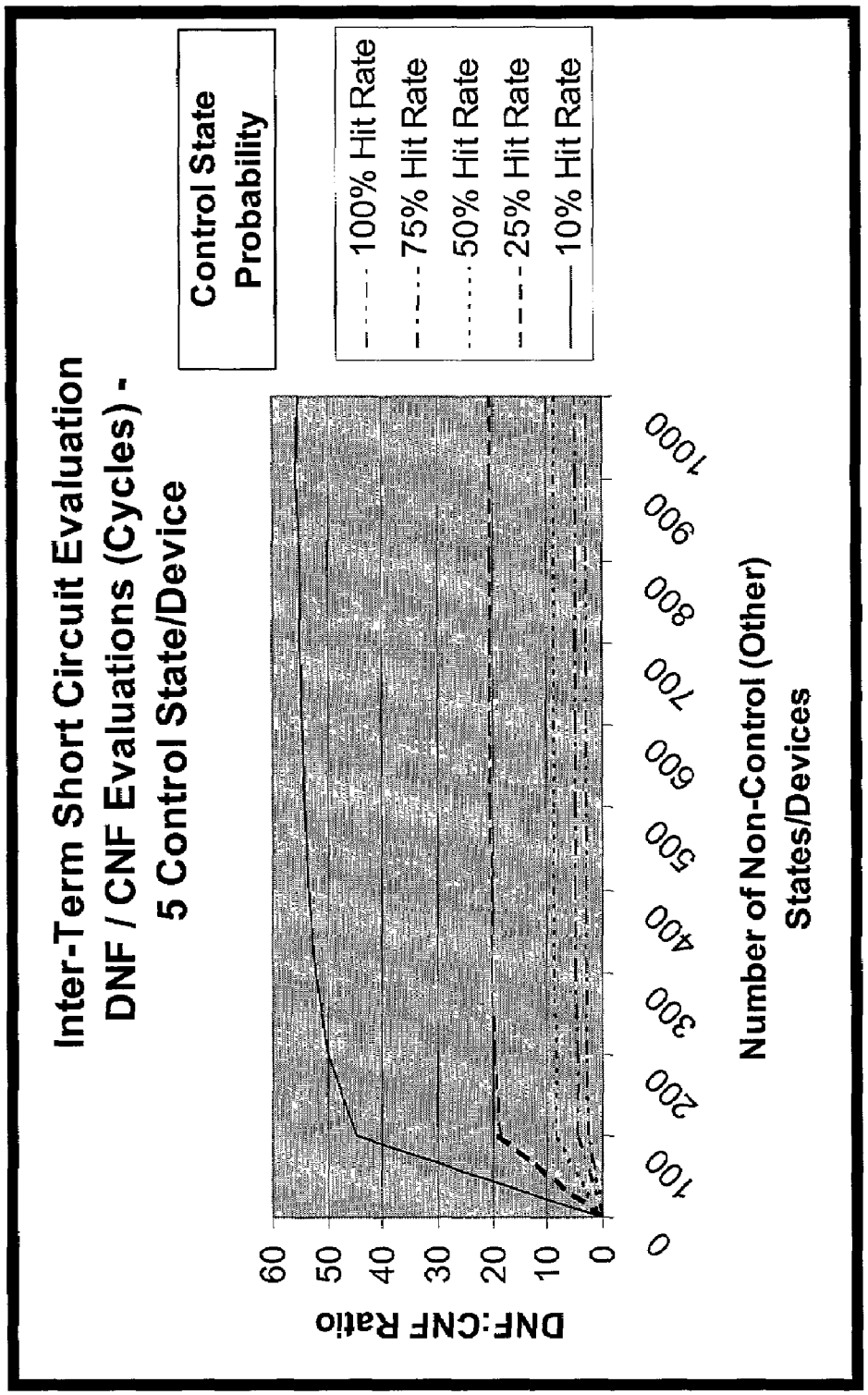
FIG. 8 is a graph of a DNF/CNF ratio using inter-term short-circuit evaluation, with 5 control states and a large number of "other" states.
Figure 9:
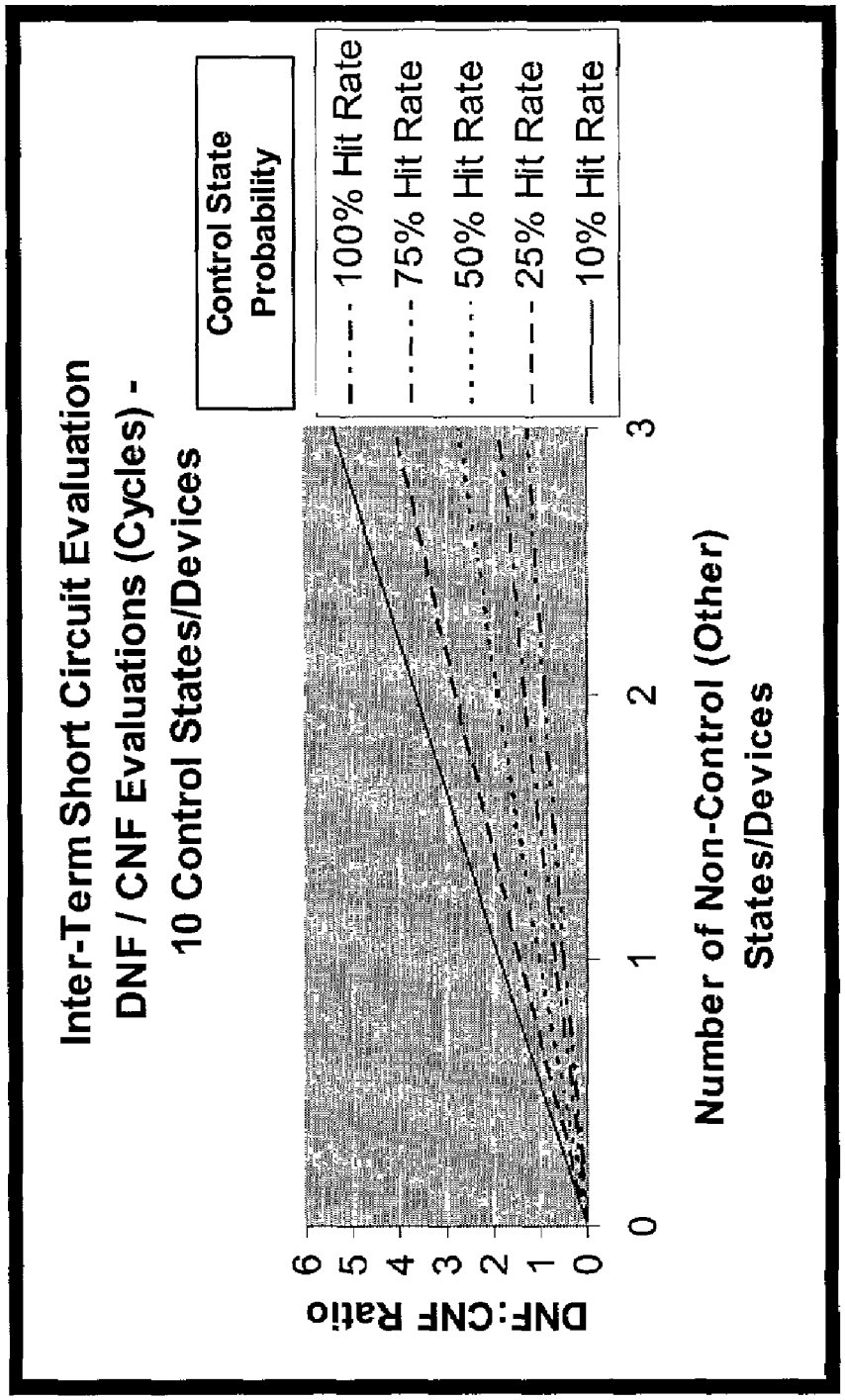
FIG. 9 is a graph of a DNF/CNF ratio using inter-term short-circuit evaluation, with 10 control states and a small number of "other" states.
Figure 10:
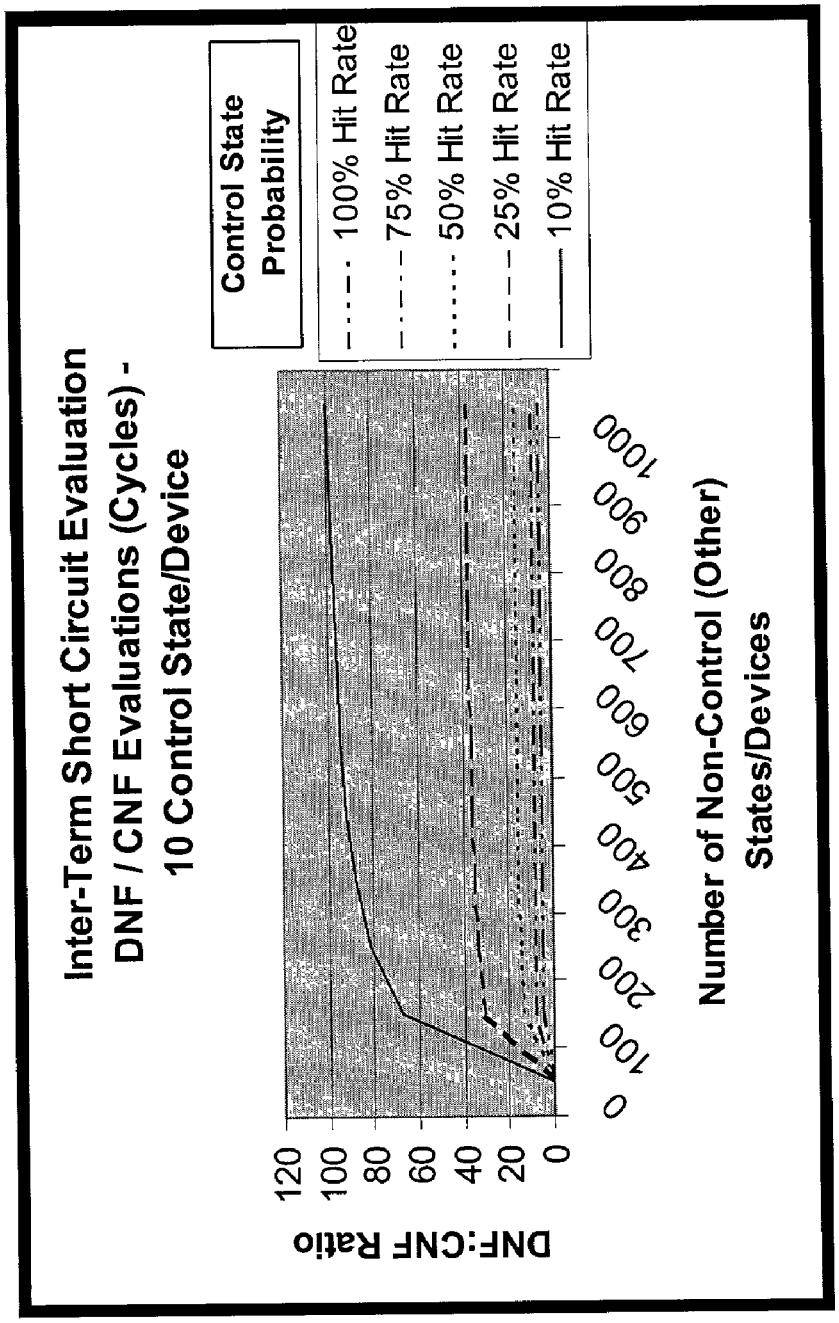
FIG. 10 is a graph of a DNF/CNF ratio using inter-term short-circuit evaluation, with 10 control states and a large number of "other" states.
Figure 11:
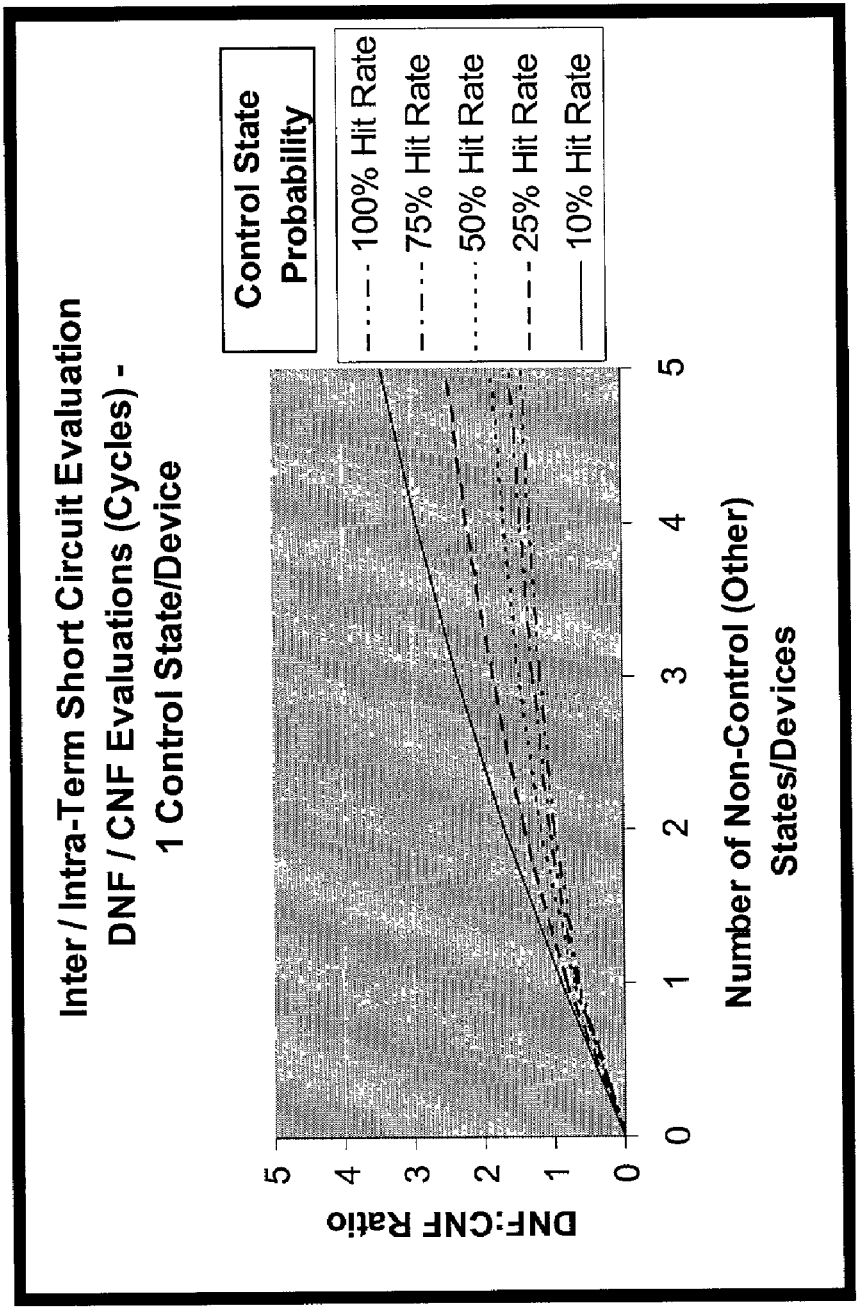
FIG. 11 is a graph of a DNF/CNF ratio using inter/intra-term short-circuit evaluation, with 1 control state and a small number of "other" states.
Figure 12:
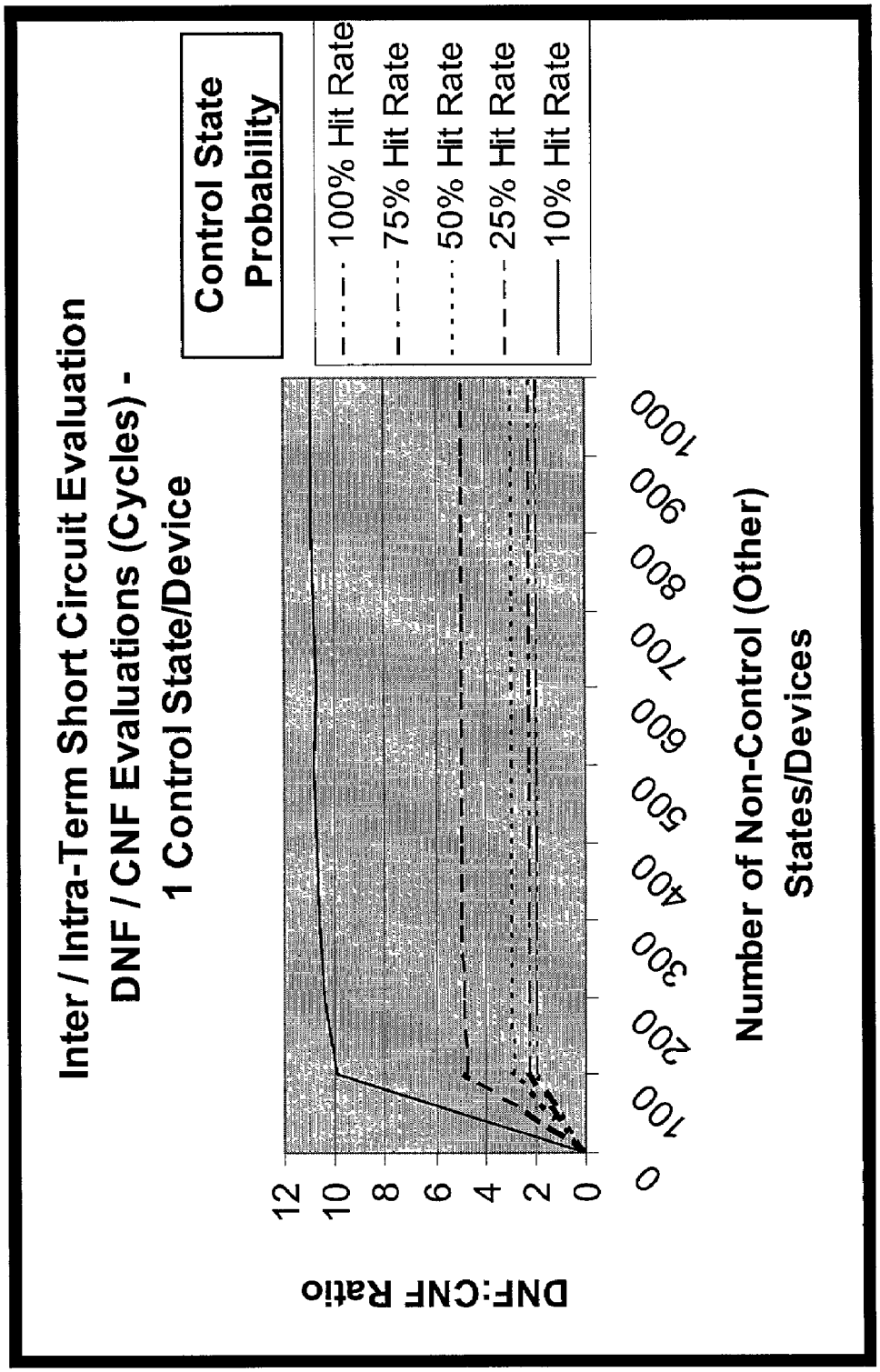
FIG. 12 is a graph of a DNF/CNF ratio using inter/intra-term short-circuit evaluation, with 1 control state and a large number of "other" states.
Figure 13:
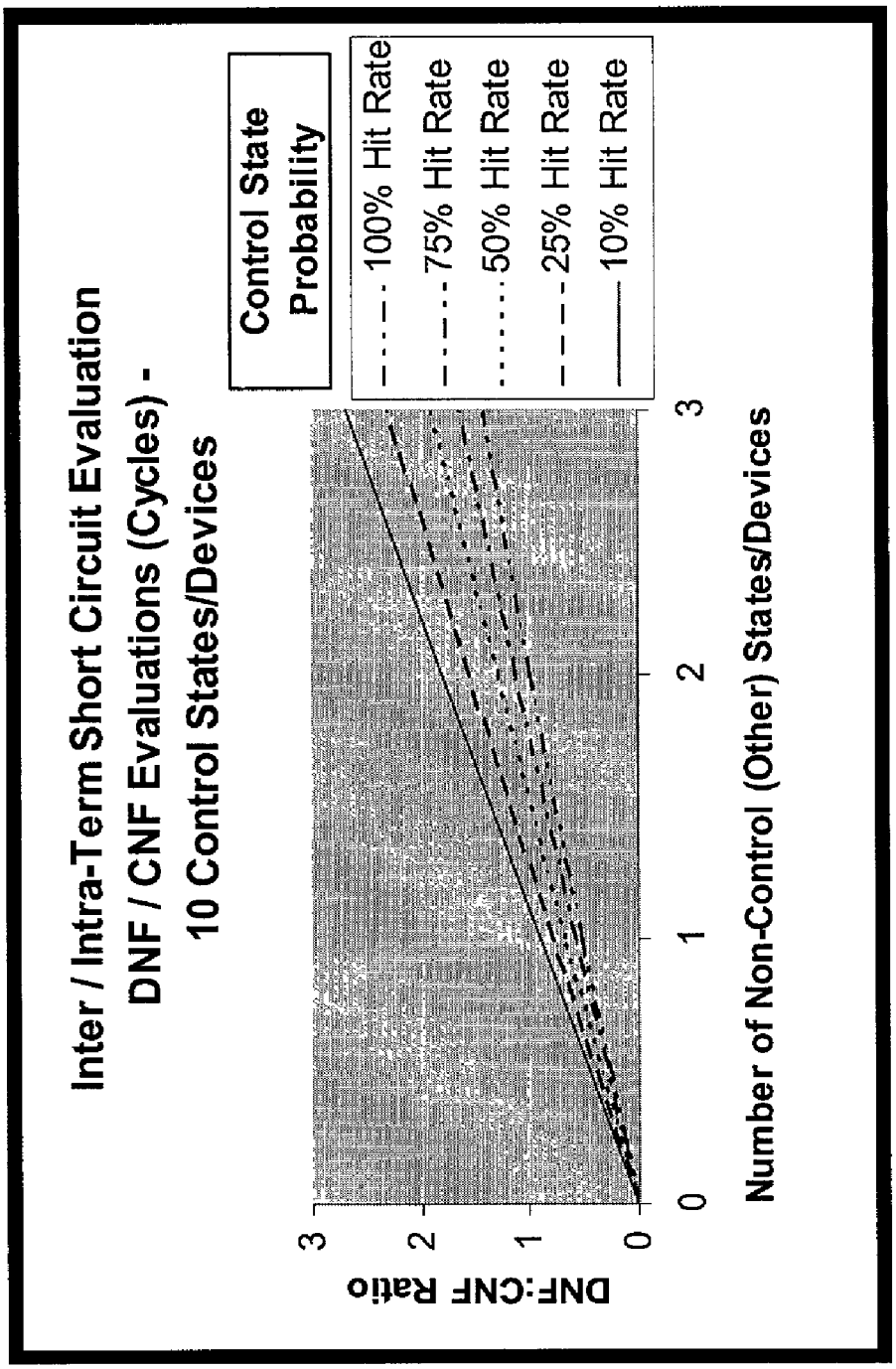
FIG. 13 is a graph of a DNF/CNF ratio using inter/intra-term short-circuit evaluation, with 10 control states and a small number of "other" states.
Figure 14:
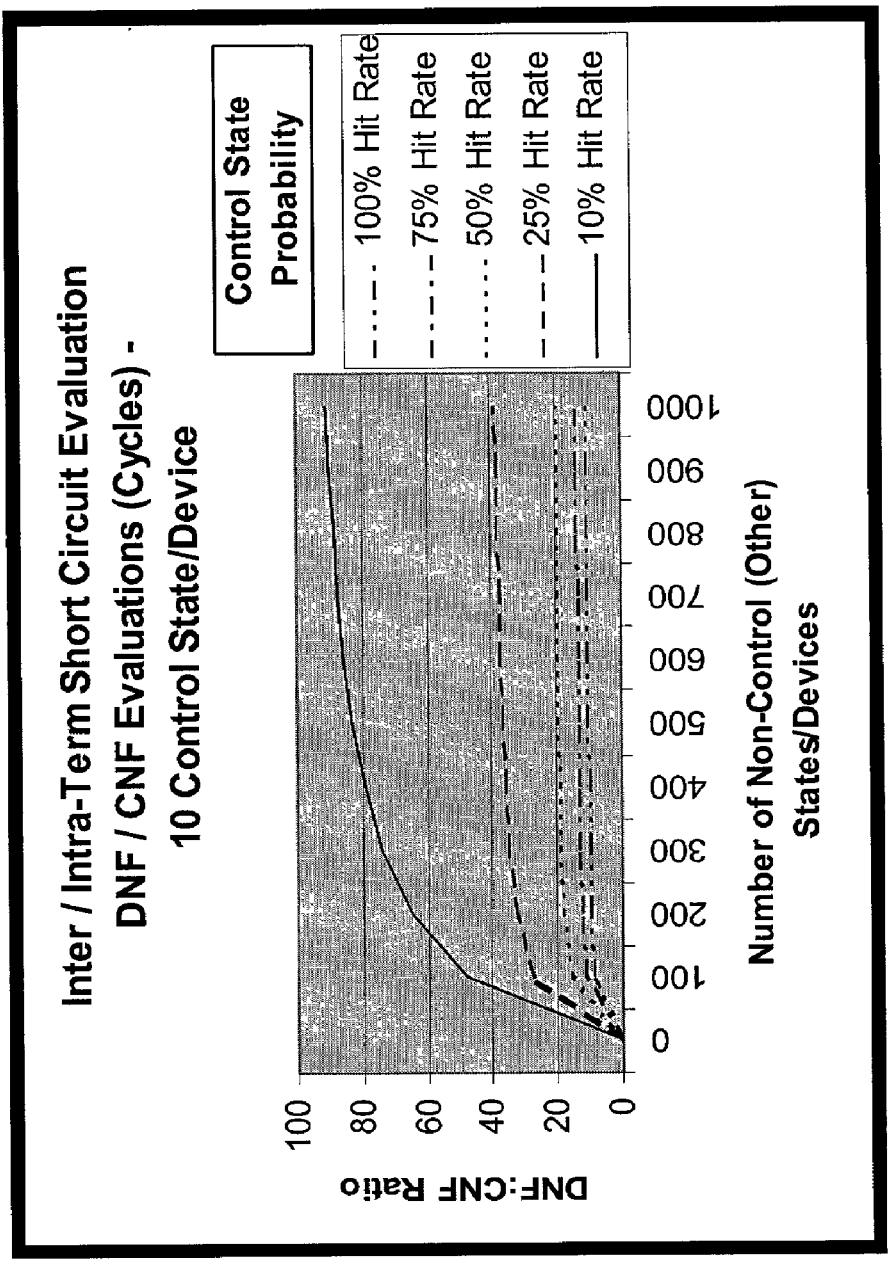
FIG. 14 is a graph of a DNF/CNF ratio using inter/intra-term short-circuit evaluation, with 10 control states and a large number of "other" states.

FIG. 5 illustrates the limited advantage of DNF. Only when the probability for the control state to evaluate to true is one-hundred percent, or the number of "other" states is less than two at a seventy-five percent control state probability, does DNF have an advantage over CNF. When the control state probability is one-hundred percent, meaning the control states are always true, and the number of "other" states becomes arbitrarily large, DNF retains its slight advantage over CNF, as illustrated in FIG. 6. This advantage becomes trivial as the difference in number of processor instructions is minimal at this small number of states. In addition, the likelihood of a one-hundred percent probability for a control state is very remote. For example, in the case of a home alarm system. An alarm will sound if the system is armed and a door or window is opened. In this case, the system being armed is the control state. In a real-world application, however, an alarm system is not continuously armed. Once the number of "other" states rises above two, CNF has a distinct advantage over DNF. This advantage becomes greater as the number of control states and "other" states rises, and the control state probability drops. This is apparent in FIGS. 5 through 10.

As the number of "other" states becomes arbitrarily large, the ratio of DNF evaluations to CNF evaluations becomes relatively constant. Taking a closer look at the formulas for DNF and CNF instructions as OS becomes relatively large and PCSD becomes relatively small, DNF becomes a function of (OS*CS), while CNF becomes a function of (OS*PCSD). Thus, the DNF to CNF instruction ratio can be expressed as an approximate function of the number of control states and their positive distribution, or hit rate, such that DNF/CNF Ratio≈CS/PCSD. Because a relatively large number of control states usually corresponds to a relatively low probability, the choice of CNF over DNF becomes advantageous as the size of the system grows.

The combination of inter and intra-term short-circuiting provides a significant performance gain over the use of either one alone. Assuming that only one of x "other" states will evaluate to true during any single evaluation of an expression, the addition of intra-term short-circuiting reduces the number of state evaluations by (0.5 *# of "Other" States) and (0.5 *# of Control States * # of "Other" States) on average for CNF and DNF expressions, respectively. Using both inter and intra-term short-circuiting, the above-referenced equations given to describe the average number of instructions for both CNF and DNF become:

$$\text{Avg. CNF Instructions} = ((ICS*CS)+(IOS*OS*POSD))*PCSD+(ICS*CS)*(1-PCSD)*FCSD, \quad (11)$$

$$\text{Avg. DNF Instructions} = ((ICS*CS+IOS)*OS*PCSD*POSD)+((ICS*CS*(1-PCSD)*FCSD+IOS)*OS. \quad (12)$$

FIGS. 11 through 14 illustrate the DNF/CNF ratio for 1 and 10 control states, each combined with small and large numbers of "other" states.

Using inter and intra-term short-circuiting together ultimately results in the identical DNF/CNF ratio (for large "other" states) as when using only inter-term short-circuiting. However, the number of average evaluations for each of the two Boolean forms is reduced by fifty percent. Prior to reaching the ratio limit, the effect of using both types of short-circuiting on DNF is especially prevalent, as illustrated by the reduction of the slope of the curve of FIG. 14 as compared with its inter-term short-circuiting counterpart of FIG. 10.

Thus, short-circuiting provides a performance gain by reducing the number of instructions evaluated by the Boolean processor 36 (FIGS. 3 and 4). The actual gain is a function of the number of control states, the number of "other" states, the number of instructions for each, and the positive distribution of each. Using the above-referenced equation for the average CNF evaluations for inter and intra-term short circuiting:

$$\text{Avg. CNF Instructions} = ((ICS*CS)+(IOS*OS*POSD))*PCSD+(ICS*CS)*(1-PCSD)*FCSD, \quad (13)$$

and the following formula for the number of evaluations for non-short-circuited CNF:

$$\text{CNF Instructions} = (ICS*CS)+(IOS*OS), \quad (14)$$

the improvement that short-circuiting provides can be evaluated, as illustrated in Table 1.

TABLE 1

Percentage of Instructions Saved Using CNF Short-Circuited Evaluation
Instead of Non-Short-Circuited Evaluation

| Control States | "Other" States | Positive Control State Distribution | Positive "Other" State Distribution | Average Short-Circuit Evaluations (FCSD = 0.5) | Non-Short-Circuit Evaluations | % Savings Using Short-Circuiting |
|---|---|---|---|---|---|---|
| 1 | 5 | 1 | 0.5 | 3.5 | 6 | 41.67% |
| 1 | 10 | 1 | 0.5 | 6 | 11 | 45.45% |
| 1 | 10 | 0.5 | 0.5 | 3.25 | 11 | 70.45% |
| 1 | 10 | 0.25 | 0.5 | 1.875 | 11 | 82.95% |
| 1 | 10 | 0.1 | 0.5 | 1.05 | 11 | 90.45% |
| 1 | 100 | 1 | 0.5 | 51 | 101 | 49.50% |
| 1 | 100 | 0.5 | 0.5 | 25.75 | 101 | 74.50% |
| 1 | 100 | 0.25 | 0.5 | 13.125 | 101 | 87.00% |
| 1 | 100 | 0.1 | 0.5 | 5.55 | 101 | 94.50% |
| 1 | 1000 | 1 | 0.5 | 501 | 1001 | 49.95% |
| 1 | 1000 | 0.5 | 0.5 | 250.75 | 1001 | 74.95% |
| 1 | 1000 | 0.25 | 0.5 | 125.625 | 1001 | 87.45% |
| 1 | 1000 | 0.1 | 0.5 | 50.55 | 1001 | 94.95% |
| 5 | 5 | 1 | 0.5 | 7.5 | 10 | 25.00% |
| 5 | 10 | 1 | 0.5 | 10 | 15 | 33.33% |
| 5 | 10 | 0.5 | 0.5 | 6.25 | 15 | 58.33% |
| 5 | 10 | 0.25 | 0.5 | 4.375 | 15 | 70.83% |
| 5 | 10 | 0.1 | 0.5 | 3.25 | 15 | 78.33% |
| 5 | 100 | 1 | 0.5 | 55 | 105 | 47.62% |
| 5 | 100 | 0.5 | 0.5 | 28.75 | 105 | 72.62% |
| 5 | 100 | 0.25 | 0.5 | 15.625 | 105 | 85.12% |
| 5 | 100 | 0.1 | 0.5 | 7.75 | 105 | 92.62% |
| 5 | 1000 | 1 | 0.5 | 505 | 1005 | 49.75% |
| 5 | 1000 | 0.5 | 0.5 | 253.75 | 1005 | 74.75% |
| 5 | 1000 | 0.25 | 0.5 | 128.125 | 1005 | 87.25% |
| 5 | 1000 | 0.1 | 0.5 | 52.75 | 1005 | 94.75% |
| 10 | 10 | 1 | 0.5 | 15 | 20 | 25.00% |
| 10 | 20 | 1 | 0.5 | 20 | 30 | 33.33% |
| 10 | 10 | 0.5 | 0.5 | 10 | 20 | 50.00% |
| 10 | 10 | 0.25 | 0.5 | 7.5 | 20 | 62.50% |
| 10 | 10 | 0.1 | 0.5 | 6 | 20 | 70.00% |
| 10 | 100 | 1 | 0.5 | 60 | 110 | 45.45% |
| 10 | 100 | 0.5 | 0.5 | 32.5 | 110 | 70.45% |
| 10 | 100 | 0.25 | 0.5 | 18.75 | 110 | 82.95% |
| 10 | 100 | 0.1 | 0.5 | 10.5 | 110 | 90.45% |
| 10 | 1000 | 1 | 0.5 | 510 | 1010 | 49.50% |
| 10 | 1000 | 0.5 | 0.5 | 257.5 | 1010 | 74.50% |
| 10 | 1000 | 0.25 | 0.5 | 131.25 | 1010 | 87.00% |
| 10 | 1000 | 0.1 | 0.5 | 55.5 | 1010 | 94.50% |

Because the number of instructions required to evaluate a control state is typically the same as the number required to evaluate "other" states, one instruction is assumed for each. The savings illustrated in the Table 1 range from twenty-five to almost ninety-five percent. While the high-end of this range represents a typical system, in terms of the number of control states versus "other" states, the low-end of the range occurs when the number of control states is equal to or near the number of "other" states. In a typical configuration, the number of "other" states outweighs the number of control states, resulting in a relatively higher instruction evaluation savings. In light of all of the above, the use of CNF outweighs any benefit provided by DNF, thereby warranting an architectural design that uses Boolean expressions compiled into CNF.

As described above, the Boolean processor 36 (FIGS. 3 and 4) is a general-purpose architecture that is intended to monitor and control its surrounding environment. The small instruction set and design of the Boolean processor 36 are intended to give it a significant speed advantage over its competition, namely other general-purpose architectures, such as microprocessors and microcontrollers. To demonstrate this advantage, the instruction set of the Boolean processor 36 is compared with the instruction sets of two other general-purpose architectures; the Intel 8051 microcontroller and the Intel 8088 family of microprocessors. In addition, the Motorola MMC2107 microcontroller is used for comparison purposes.

Like other microcontrollers, the main purpose of the 8051 is to control its surrounding environment. Because the 8051 is not optimized for Boolean operations, it requires the use of several instructions in order to emulate the functions of the Boolean processor 36 of the present invention. In addition, it also requires the use of two registers: one register to hold the intermediate results of OR calculations and another register for retrieving device states from memory. AND calculations resulting in a false value can be handled by issuing a jump past the operation that results from a true evaluation of the statement. The instructions required to perform the same operations as those of the Boolean processor 36 are illustrated in Table 2. It should be noted that the label SHORT is the label for the instruction immediately following the current CNF expression and is used for inter-term short-circuiting. The SHORTCON label is the label for the next OR term of a conjunct and is used for intra-term short-circuiting.

TABLE 2

Intel 8051 Equivalent Instructions

| Boolean Processor Instruction | 8051 Equivalent Instruction(s) | Explanation |
|---|---|---|
| AND | MOV Rr, add<br>CJNE Rr, # n, SHORT | Move the state of the device at add into register Rr. If the value in Rr is not equal to the state specified in # n, then the expression is false and may be short circuited. |
| OR | MOV Rr, add<br>CJNE Rn, # n, NEXT<br>MOV Rx, #1<br>SJMP SHORTCON<br>NEXT MOV Rx, #0 | Move the state of the device at add into register Rr. If the value in Rr is not equal to the state specified in # n, we set Rx to 0 and move on to the next OR term or the next conjunct. If it is equal, we set the value of Rx to 1 and short circuit the remainder of the conjunct. Rx will be used at the end of operation to determine the final outcome of the entire CNF expression. |
| End of Operation | CJNE Rx, #1, SHORT<br>MOV # n, add | If Rx does not equal one, then one of the conjuncts containing OR terms did not evaluate to true. Therefore, the entire expression is false. If Rx is equal to one, the expression is true and the resulting state change may be made to the device at add. |
| No Operation | NOP | PC = PC + 1 |
| Unconditional Jump | SJMP radd | Jump to the line specified by radd. |
| Conditional Jump | CJNE Rn, # n, radd | If the value in Rn is not equal to # n, then jump to the line specified by radd. |
| Start of Operation | MOV Rx, #1 | Move 1 into register Rx which is used to hold the result value of conjuncts containing OR terms. |
| Start of OR Conjunct | MOV Rx, #1 | See Start of Operation. |
| — | CJNE Rx, #1, SHORT | This operation is required at the end of an OR Conjunct. If the value of Rx is not equal to 1, the value of the conjunct and, hence, the value of the entire expression is false and may be short-circuited. |

EXAMPLE 5

The statement: If dev1=1 and dev2=3 and (dev3=1 or dev4=2) then dev6=8, is written for the Intel 8051 as follows:

| | | |
|---|---|---|
| BEGIN: | MOV R1, #1 | Initialize R1 to 1 (OR holder) |
| | MOV R0, dev1 | Move state of device 1 into R0 |
| | CJNE R0, #1, SHORT | If dev1 not = to 1 then goto SHORT |
| | MOV R0, dev2 | Move state of device 2 into R0 |
| | CJNE R0, #3, SHORT | If dev2 not = to 3 then goto SHORT |
| | MOV R0, dev3 | Move state of device 3 into R0 |
| | CJNE R0, #1, NEXT | If dev3 not = to 1 then goto NEXT |
| | MOV R1, #1 | If true set R1 to 1 |
| | SJMP SHORTCON | Jump to end of OR conjunct |
| NEXT: | MOV R1, #0 | If false set R1 to 0 |
| | MOV R0, dev4 | Move state of device 4 into R0 |
| | CJNE R0, #2, NEXT2 | If dev4 not = to 2 then goto NEXT2 |
| | MOV R1, #1 | If true set R1 to 1 |
| | SJMP SHORTCON | Jump to end of OR conjunct |
| NEXT 2: | MOV R1, #0 | If false set R1 to 0 |
| SHORTCON: | CJNE R1, #1, SHORT | If OR Holder not = 1 then goto SHORT |
| | MOV #8, dev6 | Expression is true, set dev6 = 8 |
| SHORT: | NOP | No Operation or start of next if then block |
| | SJMP BEGIN | Start again and keep testing |

The same statement is implemented for the Boolean processor 36 using the following code:

| Control Store | Instruction Register | | | |
|---|---|---|---|---|
| Address | Address | Control/State | Opcode | Functionality |
| 00000000 | 00000011 | 00000000 | 110 | Start of Boolean expr. |
| 00000001 | 00000001 | 00000001 | 000 | Dev1 = 1? (AND) |
| 00000010 | 00000010 | 00000011 | 000 | Dev2 = 3? (AND) |
| 00000011 | 00000110 | 00000000 | 111 | Start of OR conjunct |
| 00000100 | 00000011 | 00000001 | 001 | Dev3 = 1? (OR) |
| 00000101 | 00000100 | 00000010 | 001 | Dev3 = 1? (OR) |
| 00000110 | 00000110 | 00001000 | 010 | End of Operation |
| 00000111 | 00000000 | 00000000 | 100 | Jump to beginning |

What required eighteen instructions using the 8051, required only eight instructions using the Boolean processor 36. Using the differences in the number of instructions required for each operation, the extra number of instructions required to emulate the functionality of the Boolean processor 36 for an 8051 can be measured as such:

$$\text{Extra Instructions} = D\text{-}And * CS + D\text{-}Or * OS + OC + D\text{-}EoO, \quad (15)$$

where: D-And=difference in number of instructions for an And operation=1; CS=number of control states; D-Or=difference in number of instructions for an Or Operation=4; OS=number of "other" states; OC=number of OR conjuncts; and D–EoO=difference in number of instructions for an End of Operation=1. Simplified, the resulting equation is:

$$\text{Extra Instructions} = CS + 4OS + OC + 1. \quad (16)$$

Figure 15:
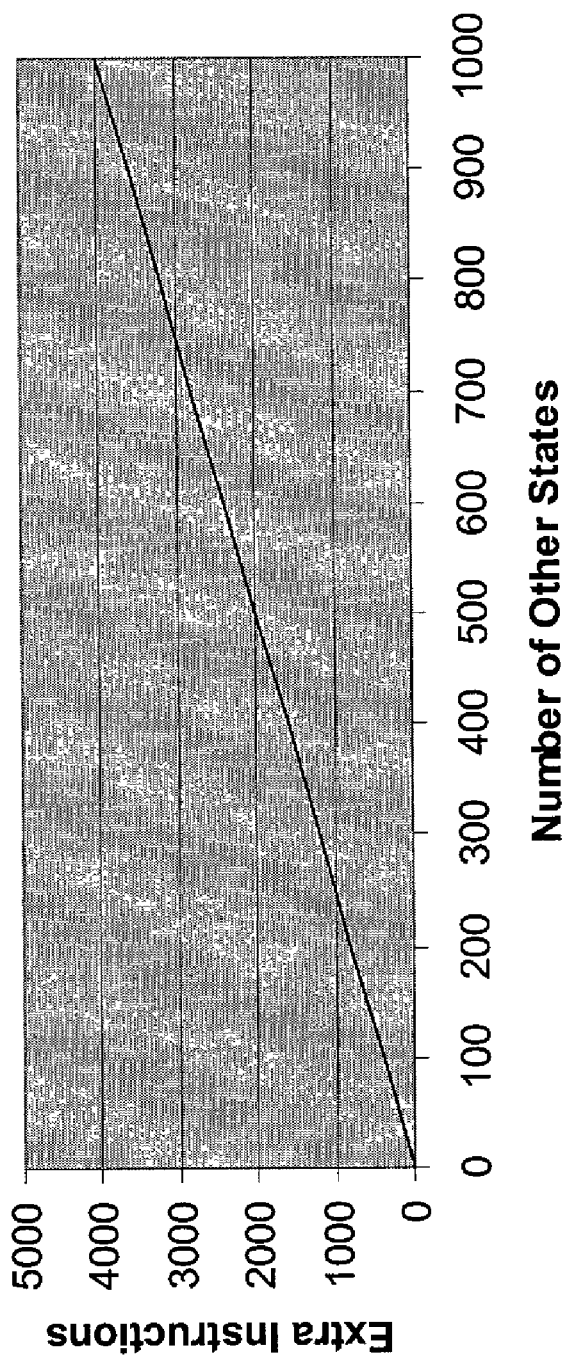
FIG. 15 is a graph of the relative performance of the Intel 8051 microcontroller versus the Boolean processor of the present invention.

The two jump codes, the two start codes, and the no-op code are not included in the calculation because they all require one instruction on each architecture and would, therefore, cancel out with a difference of zero. The number of OR conjuncts is taken into account since the 8051 requires an extra instruction to handle each one. Assuming, that as the size of system grows, the number of "other" states grows exponentially relative to the number of control states and the number of OR conjuncts; the number of extra instructions becomes a linear function such that: Extra Instructions=4OS. This difference becomes significant as the number of "other" states becomes relatively large, as illustrated in FIG. 15.

The Intel 8086 family of microprocessors includes upward-compatibility which allows code written for previous-generation chips to be run on its ancestors. The 8086 family includes the 8086, 80186, 80286, 80386, 80486, and the Pentium models, each offering enhancements to that of its predecessor in terms of performance, memory management, and, in some cases, instruction sets. The basic jump, test, and move instructions required to emulate the functionality of the Boolean processor 36 are part of each of the processor's basic instruction set and can be used to represent the entire family. Being general-purpose platforms, the Intel microprocessors, like the 8051, are not optimized for Boolean operations. As a result, they also require the use of two registers for holding the results of OR operations and for storing states retrieved from memory. The instructions required to perform the same operations as those of the Boolean processor are illustrated in Table 3.

EXAMPLE 6

The statement given in the previous Intel 8051 example: If dev1=1 and dev2=3 and (dev3=1 or dev4=2) then dev6=8, would be written for an 8086 processor as follows:

| BEGIN: | MOV R1, #1 | Initialize R1 to 1 (OR holder) |
|---|---|---|
| | MOV R0, dev1 | Move state of device 1 into R0 |
| | CMP R0, #1 | Compare dev1 state to 1 |
| | JNE SHORT | If dev1 not = to 1 then goto SHORT |
| | MOV R0, dev2 | Move state of device 2 into R0 |
| | CMP R0, #3 | Compare dev2 state to 3 |
| | JNE SHORT | If dev2 not = to 3 then goto SHORT |
| | MOV R0, dev3 | Move state of device 3 into R0 |
| | CMP R0, #1 | Compare dev3 state to 1 |
| | JNE NEXT | If dev3 not = to 1 then goto NEXT |
| | MOV R1, #1 | If true set R1 to 1 |
| | JMP SHORTCON | Jump to end of OR conjunct |
| NEXT: | MOV R1, #0 | If false set R1 to 0 |
| | MOV R0, dev4 | Move state of device 4 into R0 |
| | CMP R0, #2 | Compare dev4 state to 2 |
| | JNE NEXT2 | If dev4 not = to 2 then goto NEXT 2 |
| | MOV R1, #1 | If true set R1 to 1 |
| | JMP SHORTCON | Jump to end of OR conjunct |
| NEXT 2: | MOV R1, #0 | If false set R1 to 0 |
| SHORT-CON: | CMP R1, #1 | Compare OR Holder to 1 |
| | JNE SHORT | If OR Holder not = 1 then goto SHORT |
| | MOV #8, dev6 | Expression is true, set dev6 = 8 |
| SHORT: | NOP | No Operation or start of next if then block |
| | JMP BEGIN | Start again and keep testing |

In the above-referenced example, the 8086 family requires twenty-four instructions to execute the same functionality that only requires eight instructions for the Boolean

TABLE 3

Intel 8086 Family of Microprocessors Equivalent Instructions

| Boolean Processor Instruction | 8086 Family Equivalent Instruction(s) | Explanation |
|---|---|---|
| AND | MOV Rr, add<br>CMP Rr, # n<br>JNE SHORT | Move the state of the device at add into register Rr, If the value in Rr is not equal to the state specified in # n, then the expression is false and may be short circuited. |
| OR | MOV Rr, add<br>CMP Rn, # n<br>JNE NEXT<br>MOV Rx, #1<br>JMP SHORTCON<br>NEXT MOV Rx, #0 | Move the state of the device at add into register Rr. If the value in Rr is not equal to the state specified in # n, we set Rx to 0 and move on to the next OR term or the next conjunct. If it is equal, we set the value of Rx to 1 and short circuit the remainder of the conjunct. Rx will be used at the end of operation to determine the final outcome of the entire CNF expression. |
| End of Operation | CMP Rx, #1<br>JNE SHORT<br>MOV # n, add | If Rx does not equal one, then one of the conjuncts containing OR terms did not evaluate to true. Therefore, the entire expression is false. If Rx is equal to one, the expression is true and the resulting state change may be made to the device at add. |
| No Operation | NOP | PC = PC + 1 |
| Unconditional Jump | SJMP radd | Jump to the line specified by radd. |
| Conditional Jump | CMP Rn, # n<br>JNE radd | If the value in Rn is not equal to # n, then jump to the line specified by radd. |
| Start of Operation | MOV Rx, #1 | Move 1 into register Rx which is used to hold the result value of conjuncts containing OR terms. |
| Start of OR Conjunct | MOV Rx, #1 | See Start of Operation. |
| — | CMP Rx, #1<br>JNE SHORT | This operation is required at the end of an OR Conjunct. If the value of Rx is not equal to 1, the value of the conjunct and, hence, the value of the entire expression is false and may be short-circuited. | processor 36. Using the differences in the number of instructions required for each operation, the extra number of instructions required to emulate the functionality of the Boolean processor 36 for the 8086 can be measured as such:

$$\text{Extra Instructions} = D\text{-}And*CS + D\text{-}Or*OS + CJ + D\text{-}OC*OC + D\text{-}EoO, \quad (17)$$

where: D-And=difference in number of instructions for an And operation=1; CS=number of control states; D-Or=difference in number of instructions for an Or Operation=4; OS=number of "other" states; CJ=number of conditional jumps (difference=1); D-OC=difference in number of instructions for an Or Conjunct=2; OC=number of OR conjuncts; and D-EoO=difference in number of instructions for an End of Operation. Simplified, the resulting equation is:

$$\text{Extra Instructions} = 2CS + 5OS + CJ + 2OC + 2. \quad (18)$$

Figure 16:
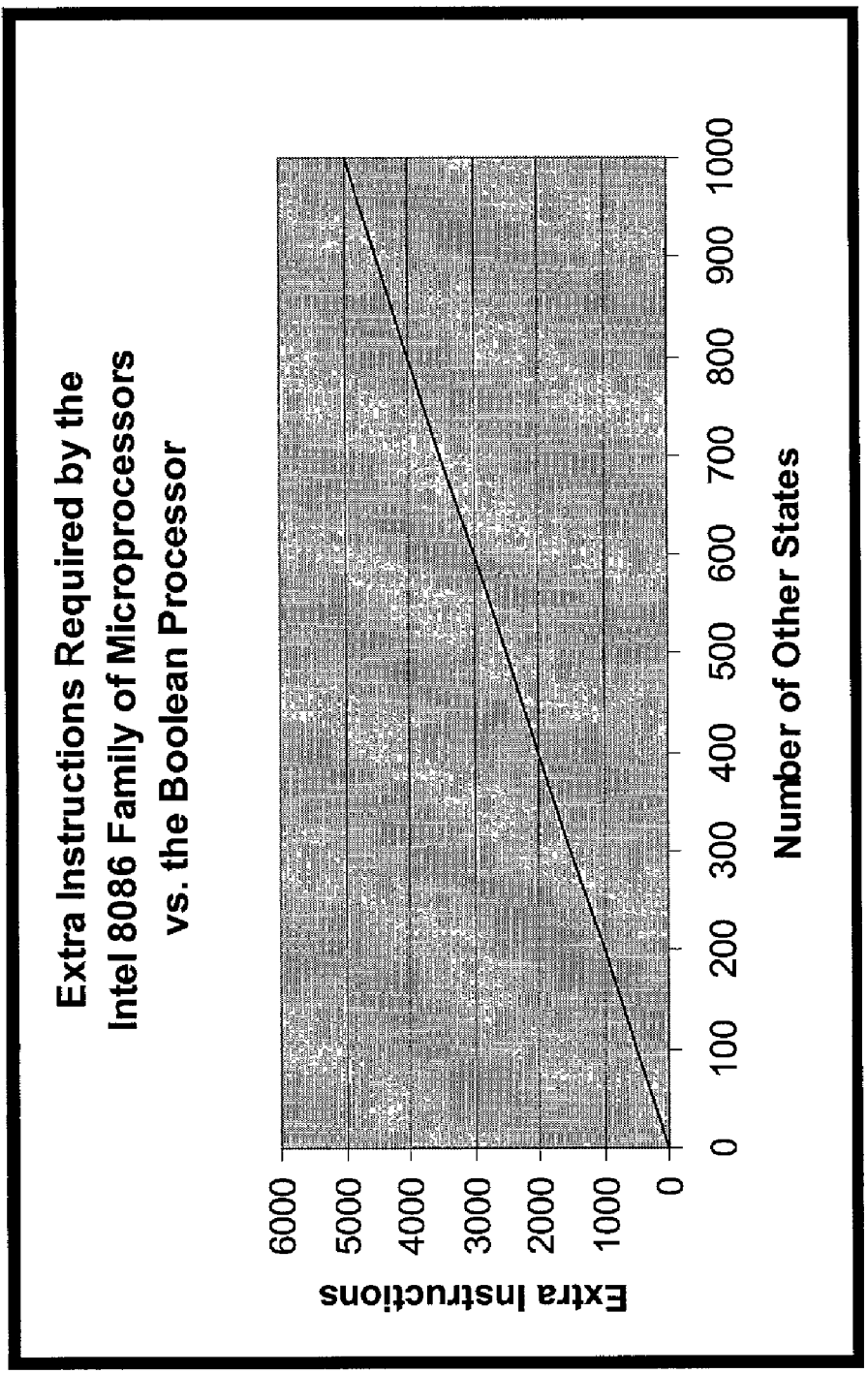
FIG. 16 is a graph of the relative performance of the Intel 8086 family of microprocessors versus the Boolean processor of the present invention.

The unconditional jump code, the two start codes, and the no-op code are not included in the calculation because they all require one instruction for each architecture and would, therefore, cancel out with a difference of zero. Assuming that as the size of system grows, the number of "other" states grows exponentially relative to the number of control states and the number of OR conjuncts, the number of extra instructions becomes a linear function such that: Extra Instructions=5OS, as illustrated in FIG. 16.

The Motorola MMC2107 is a microcontroller that is designed to meet the needs of distribution channel customers dealing with applications, such as vending machines, building management and heating-ventilation-air conditioning (HVAC) systems, exercise equipment and lighting control. Similar to the comparisons of the Boolean processor 36 to the 8051 and 8086 family, the emulation of the Boolean processor 36 by the MMC2107 requires the use of two registers for holding the results of OR operations and for storing states retrieved from memory. The instructions required to perform the same operations as those of the Boolean processor 36 are illustrated in Table 4.

| Boolean Processor Instruction | Motorola MMC2107 Equivalent Instruction(s) | Explanation |
|---|---|---|
| AND | LDB Rr, add<br>CMPNEI Rr, imm5<br>BT SHORT<br>- or -<br>LDB Rr, add<br>MOVI Rn, imm7<br>CMPNE Rr, Rn<br>BT SHORT<br>- or -<br>LDB Rr, add<br>MOVI Rn, imm7<br>LSLI Rn, imm5<br>ADDI Rn, oimm5<br>CMPNE Rr, Rn<br>BT SHORT | Load the state of the device at add into register Rr, If the value in Rr is not equal to the state specified in imm5, then the expression is false and may be short circuited. (This is used for up to 32 states).<br>Load the state of the device at add into register Rr, Put the value of the state being compared in Rn. If the value in Rr is not equal to the state in Rn, then the expression is false and may be short circuited. (This is used for up to 128 states).<br>Load the state of the device at add into register Rr, Put the value of the state being compared in Rn. In order to compare Rr to a number greater than 127, the value must be loaded into Rn via a series of Logical Left Shifts and Adds. If the value in Rr is not equal to the state in Rn, then the expression is false and may be short circuited. (This is used for states >128). |
| OR | LDB Rr, add<br>CMPNEI Rn, imm5<br>BT NEXT<br>MOVI Rx, 1<br>JMPI SHORTCON<br>NEXT MOVI Rx, 0<br>- or -<br>LDB Rr, add<br>MOVI Rn, imm7<br>CMPNE Rr, Rn<br>BT NEXT<br>MOVI Rx, 1<br>JMPI SHORTCON<br>NEXT MOVI Rx, 0<br>- or -<br>LDB Rr, add<br>MOVI Rn, imm7<br>LSLI Rn, imm5<br>ADDI Rn, oimm5<br>CMPNE Rr, Rn<br>BT NEXT<br>MOVI Rx, 1<br>JMPI SHORTCON<br>NEXT MOVI Rx, 0 | Move the state of the device at add into register Rr. If the value in Rr is not equal to the state specified in imm5, we set Rx to 0 and move on to the next OR term or the next conjunct. If it is equal, we set the value of Rx to 1 and short circuit the remainder of the conjunct. Rx will be used at the end of operation to determine the final outcome of the entire CNF expression. (This block is used for up to 32 states.)<br>Move the state of the device at add into register Rr. Load the comparison value into Rn. If the value in Rr is not equal to Rn, we set Rx to 0 and move on to the next OR term or the next conjunct. If it is equal, we set the value of Rx to 1 and short circuit the remainder of the conjunct. Rx will be used at the end of operation to determine the final outcome of the entire CNF expression. (This block is used for up to 128 states.)<br>Move the state of the device at add into register Rr. Load the comparison value into Rn. In order to compare Rr to a number greater than 127, the value must be loaded into Rn via a series of Logical Left Shifts and Adds. If the value in Rr is not equal to Rn, we set Rx to 0 and move on to the next OR term or the next conjunct. If it is equal, we set the value of Rx to 1 and short circuit the remainder of the conjunct. Rx will be used at the end of operation to determine the final outcome of the entire CNF expression. (This block is used for >128 states.) |

Motorola MMC2107 Equivalent Instructions

| Boolean Processor Instruction | Motorola MMC2107 Equivalent Instruction(s) | Explanation |
|---|---|---|
| End of Operation | CMPNEI Rx, 1<br>BT SHORT<br>MOVI Rn, imm7<br>STB Rn, add<br>- or -<br>CMPNEI Rx, 1<br>BT SHORT<br>MOVI Rn, imm7<br>LSLI Rn, imm5<br>ADDI Rn, oimm5<br>STB Rn, add | If Rx does not equal one, then one of the conjuncts containing OR terms did not evaluate to true. Therefore, the entire expression is false. If Rx is equal to one, the expression is true and the resulting state change may be made to the device at add. (This block is used for up to 128 state values.)<br>If Rx does not equal one, then one of the conjuncts containing OR terms did not evaluate to true. Therefore, the entire expression is false. If Rx is equal to one, the expression is true and the resulting state change may be made to the device at add. In order to make a state change to a value higher than 127, the value must be loaded into Rn via a series of Logical Left Shifts and Adds. (This block is used for >128 state values.) |
| No Operation | ADDI PC, 1 | Increment the program counter by 1. PC = PC + 1 |
| Unconditional Jump | JMPI radd | Jump to the line specified by radd. |
| Conditional Jump | CMPNEI Rr, imm5<br>BT radd<br>- or -<br>MOVI Rr, imm7<br>CMPNE Rr, Rn<br>BT radd<br>- or -<br>MOVI Rn, imm7<br>LSLI Rn, imm5<br>ADDI Rn, oimm5<br>CMPNE Rr, Rn<br>BT radd | If the value in Rr is not equal to imm5, then jump to the line specified by radd. (This block is used for comparison with values up to 32).<br>Place the comparison state value in Rn. If the value in Rr is not equal to the value in Rn, then jump to the line specified by radd. (This block is used for comparison with values up to 127).<br>Place the comparison state value in Rn . . . In order to load Rn with a value higher than 127, the value must be loaded into Rn via a series of Logical Left Shifts and Adds. If the value in Rr is not equal to the value in Rn, then jump to the line specified by radd. (This block is used for comparison with values >127). |
| Start of Operation | MOVI Rx, 1 | Move 1 into register Rx which is used to hold the result value of conjuncts containing OR terms. |
| Start of OR Conjunct | MOVI Rx, 1 | See Start of Operation. |
| — | CMPNEI Rx, 1<br>BT SHORT | This operation is required at the end of an OR Conjunct. If the value of Rx is not equal to 1, the value of the conjunct and, hence, the value of the entire expression is false and may be short-circuited. |

EXAMPLE 7

The statement given in the previous 8051 and 8086 family examples: If dev1=1 and dev2=3 and (dev3=1 or dev4=2) then dev6=8, would be written for the MMC2107 as follows:

| | | | |
|---|---|---|---|
| BEGIN: | MOVI | R1, 1 | Initialize R1 to 1 (OR holder) |
| | LDB | R0, dev1 | Move state of device 1 into R0 |
| | CMPNEI | R0, 1 | Compare dev1 state to 1 |
| | BT | SHORT | If dev1 not = to 1 then goto SHORT |
| | LDB | R0, dev2 | Move state of device 2 into R0 |
| | CMPNEI | R0, 3 | Compare dev2 state to 3 |
| | BT | SHORT | If dev2 not = to 3 then goto SHORT |
| | LDB | R0, dev3 | Move state of device 3 into R0 |
| | CMPNEI | R0, 1 | Compare dev3 state to 1 |
| | BT | NEXT | If dev3 not = to 1 then goto NEXT |
| | MOVI | R1, 1 | If true set R1 to 1 |
| | JMPI | SHORTCON | Jump to end of OR conjunct |
| NEXT: | MOVI | R1, 0 | If false set R1 to 0 |
| | LDB | R0, dev4 | Move state of device 4 into R0 |
| | CMPNEI | R0, 2 | Compare dev4 state to 2 |
| | BT | NEXT 2 | If dev4 not = to 2 then goto NEXT 2 |
| | MOVI | R1, 1 | If true set R1 to 1 |
| | JMPI | SHORTCON | Jump to end of OR conjunct |
| NEXT 2: | MOVI | R1, #0 | If false set R1 to 0 |
| SHORTCON: | CMPNEI | R1, 1 | Compare OR Holder to 1 |
| | BT | SHORT | If OR Holder not = 1 then goto SHORT |
| | MOVI | R0, 8 | Expression is true, set dev6 = 8 |
| | STB | R0, dev6 | |
| SHORT: | NOP | | No Operation or start of next if then block |
| | JMP | BEGIN | Start again and keep testing |

In the above-referenced example, the MMC2107 requires twenty-five instructions to execute the same functionality that only requires eight instructions for the Boolean processor 36. It should also be noted that theMMC2107's M●CORE™ instruction set requires the use of additional instructions for loading and comparing values greater than thirty-two (see the "Explanation" column of Table 4). Using the differences in the number of instructions required for each operation, the extra number of instructions required to emulate the functionality of the Boolean processor 36 for a Motorola MMC2107 can be measured as such:

$$\text{Extra Instructions} = D\text{-}And*CS + D\text{-}Or*OS + CJ + D\text{-}OC*OC + D\text{-}EoO, \quad (19)$$

where: D–And=difference in number of instructions for an And operation; CS=number of control states; D–Or=difference in number of instructions for an Or Operation; OS=number of "other" states; CJ=number of conditional jumps; D–OC=difference in number of instructions for an Or Conjunct; OC=number of OR conjuncts; and D–EoO=difference in number of instructions for an End of Operation. Simplified, the resulting equations are:

$$\text{Extra Instructions} = 2CS + 5OS + CJ + 2OC + 3 \text{ (for <32 states)}, \quad (20)$$

$$\text{Extra Instructions} = 3CS + 6OS + 2CJ + 2OC + 3 \text{ (for <=128 states), and} \quad (21)$$

$$\text{Extra Instructions} = 5CS + 8OS + 4CJ + 2OC + 5 \text{ (for >128 states).} \quad (22)$$

The unconditional jump code, the two start codes, and the no-op code are not included in the calculation because they all require one instruction on each architecture and would, therefore, cancel out with a difference of zero. Assuming, that as the size of system grows, the number of "other" states grows exponentially relative to the number of control states and the number of OR conjuncts, the number of extra instructions becomes a series of linear functions such that:

$$\text{Extra Instructions} = 5OS \text{ (for <32 states)}, \quad (23)$$

$$\text{Extra Instructions} = 6OS \text{ (for <=128 states), and} \quad (24)$$

$$\text{Extra Instructions} = 8OS* \text{ (for >128 states).} \quad (25)$$

*(These values could change depending upon the size of the values being loaded and compared)

Figure 17:
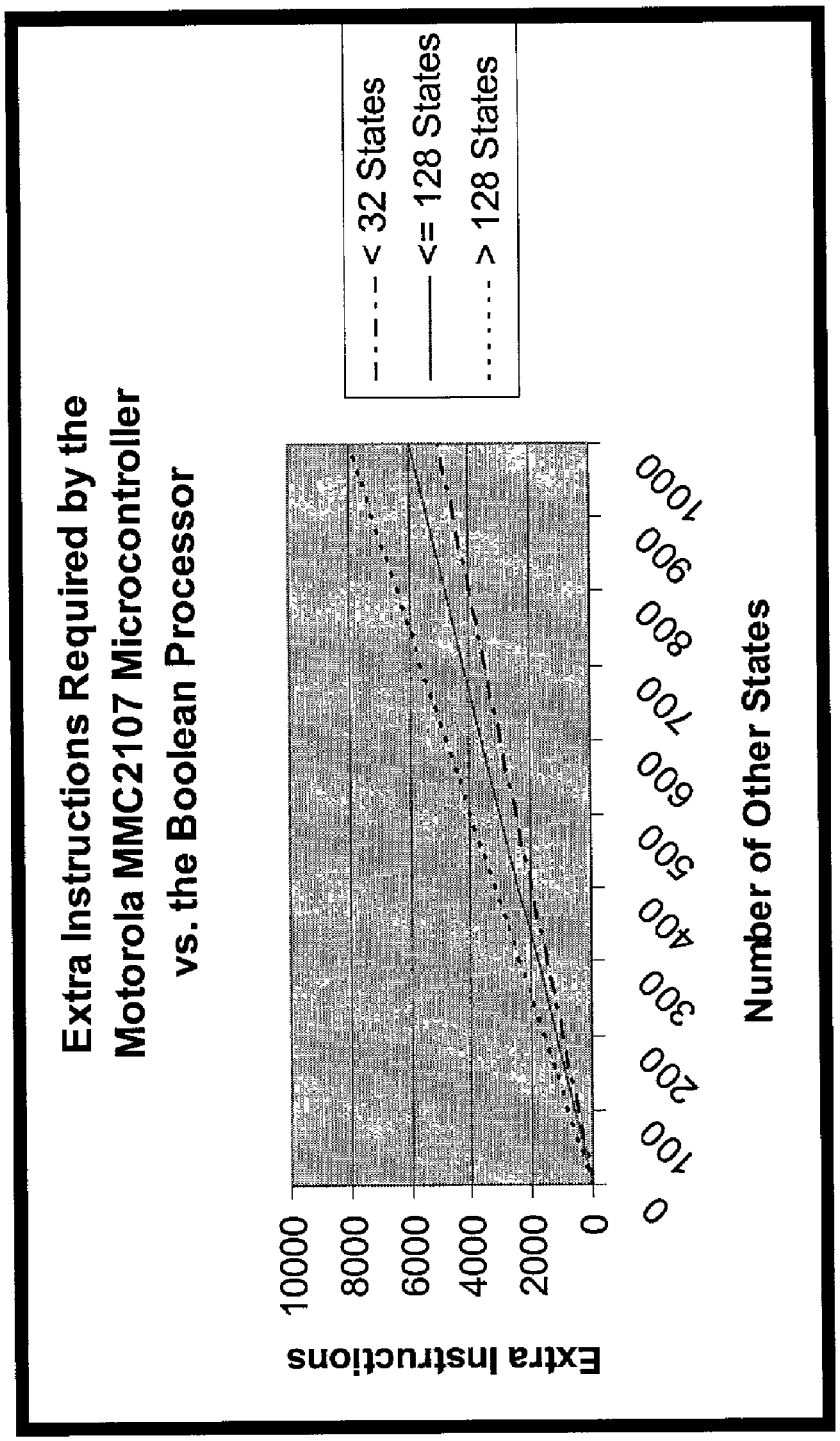
FIG. 17 is a graph of the relative performance of the Motorola MMC2107 microcontroller versus the Boolean processor of the present invention.

These functions are illustrated in FIG. 17.

An exemplary application for the Boolean processor 36 (FIGS. 3 and 4) is to manage the state of a set of devices, where the state of one or more devices may necessitate a change in one or more other devices. An example is a home alarm system: "If a door or window is opened while the system is armed, sound an alarm". The architecture provides a mechanism for a device to report information about itself, that is, its state information, and also a mechanism for changing the state of any device attached to the system. For example, a home automation and alarm system could constantly monitor the state of any number of devices in a house; from doors and windows, to lamps, to televisions, to VCRs. It provides a means for checking the open/closed status of doors and windows, checking whether or not an electrical device is on or off, and also changing the state of the devices (e.g., change the TV channel or turn a lamp on).

Another exemplary use for the Boolean processor 36 is for automobile automation. For example, a proximity sensor could be attached to a car. It is responsible for sensing how close the car is to an object. If the distance between the car and the object closes to within a predetermined distance, the proximity sensor reports a state of 'too close' to the Boolean processor 36. The Boolean processor 36 recognizes this state and initiates a state change to the brake system, thereby slowing the car until a safe distance is achieved.

As described above, the Boolean processor 36 is designed for monitoring and automation applications ranging from small to large-scale. These applications can range from home automation and alarm systems to aeronautical and automobile control systems. The Boolean processor 36 is capable of monitoring any type of device provided that the device meets the following criteria: it is capable of receiving an n-bit address from the processor 36 (this address is used by both the device and the processor 36 to recognize state reporting and enable state changes); it is capable of recognizing its address and reporting its state in an m-bit word, where m is the word size of the device stage storage unit (RAM) 64; and it is capable of recognizing its address and changing its operating state on demand. While the outbound portion of the communications between the processor 36 and the devices it controls is achieved via a direct connection, the inbound portion is achieved by a complementary architecture that polls devices for their states and loads the states in the RAM 64 of the processor 36. In order to meet the above listed requirements for using the processor 36 in practical applications, two complementary architectures have been designed: a device polling unit and a device interface unit.

Figure 18:
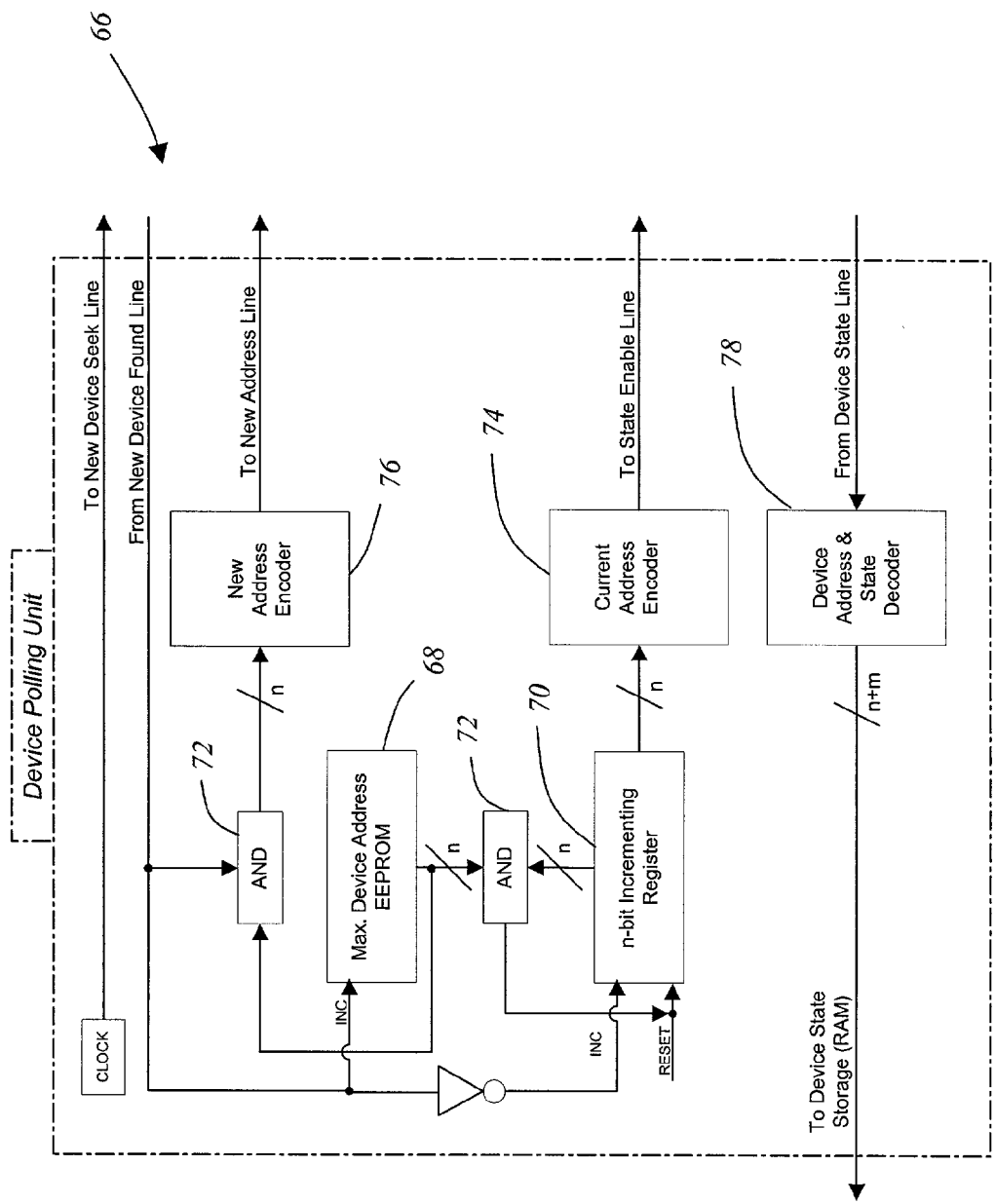
FIG. 18 is a schematic diagram of one embodiment of the architecture of the device polling unit of the present invention.

Referring to FIG. 18, the device polling unit 66 functions as the main interface between the peripheral devices and the RAM 64. The device polling unit 66 is responsible for finding new devices, assigning device addresses, polling the devices for their current states, and updating the RAM 64 with those states. The device polling unit 66 includes a maximum device address electrically-erasable programmable read-only memory (EEPROM) 68, which stores the highest address of all known devices on the system. The maximum device address EEPROM 68 has an increment line, which increments its value by one whenever it is asserted. It also has n output lines, which constantly output its value. Its value is incremented when a new device is added to the system via the assertion of the new device found line. The device polling unit 66 also includes an n-bit incrementing register 70, which holds an n-bit number representing the current address of the device being polled. It has a reset line, which sets the register to zero when asserted. It also has an increment line and n output lines, which constantly output its value to an AND unit 72 and a current address encoder 74. If a new device is not found on the system, the negation of the new device found line asserts the increment line on the register, enabling it to cycle through and poll all of the attached devices by address. The device polling unit 66 includes two AND units 72. One unit allows the value of the maximum device address EEPROM 68 to be sent to a new address encoder 76 if the new address line has been asserted (i.e. a new device has been detected). The second AND unit 72 is used to reset the incrementing register 70 if it equals the maximum device address. The latter is used to conserve clock cycles. Without it, the register would reset upon overflow. In its absence, however, the design would work with n devices; it saves $2^n-(\#$ of attached devices) clock cycles each time it polls all of the attached devices. The device polling unit 66 includes two address encoders. These units are designed to take n bits in parallel and output them serially. One encodes new addresses, while the other encodes the address of the device being polled. The device polling unit 66 further includes a device address and state decoder 78, which accepts serial input in blocks of n+m bits, representing the device address and the state of the device, respectively, and outputs them in parallel to the RAM 64. It should be noted that the encoder and decoder are not mandatory, and are only required in the case that a serial bus device is used.

The device polling unit 66 operates in a continuous loop after it is started. First, it checks for new devices added to the system. If a new device is found (the new device found line is asserted), the device polling unit 66 assigns a system address to it. If a new device is not present in the system, the n-bit incrementing register 70 is incremented, the device polling unit 66 polls the device corresponding to the address in the incrementing register 70, and then copies the device's current state into the RAM 64. The loop is then repeated. Once the device polling unit 66 is running, it continues to loop, polling for new devices and retrieving device states.

The device polling unit 66 finds new devices by clocking (asserting) the new device seek line. If a new device exists, the new device found line is asserted, incrementing the maximum device address EEPROM 68 and activating the AND gate 72, which allows the address to pass into the new address encoder 76.

Device polling is achieved via the incrementing register 70, which constantly outputs its value to the current address encoder 74. It loops through all of the device addresses. The end of the series of devices is recognized when the current device address reaches the maximum device address. This is determined when the result of the current device address AND's with the maximum device address EEPROM's value, resetting the incrementing register 70 to zero. For each address, the device polling unit 66 asserts the state enable line, requesting the device's state. When a device detects its address on the state enable line, it outputs (e.g., serially) its address and state on the device state line. The device address and state decoder 78 then outputs the n+m bits (representing the device address and state, respectively) to the RAM 64.

Figure 19:
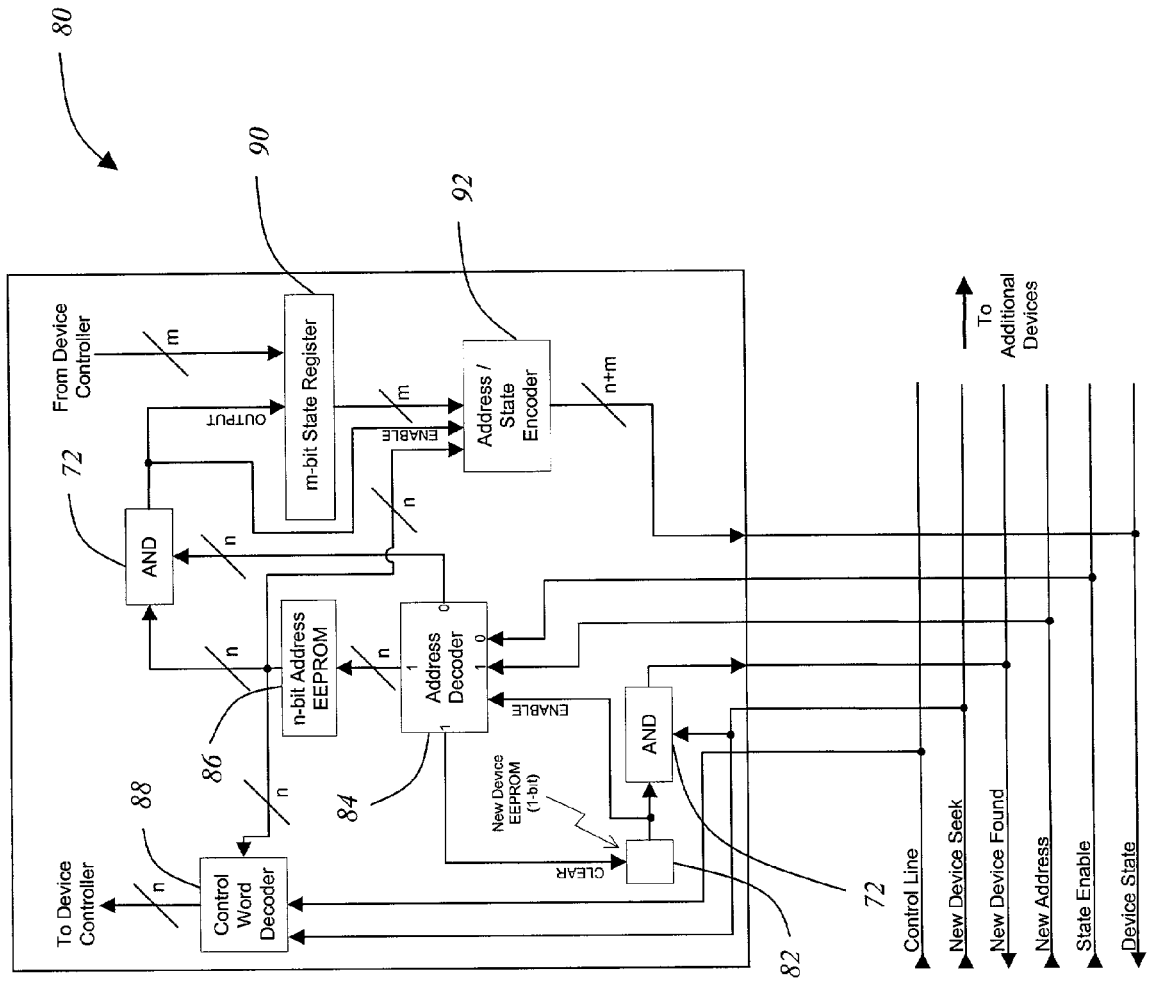
FIG. 19 is a schematic diagram of one embodiment of the architecture of the device interface unit of the present invention.

Referring to FIG. 19, each device that interfaces with the Boolean processor 36 (FIGS. 3 and 4) is assumed to be a relatively intelligent device that can accept an n-bit address and has up to m states. Accordingly, the device interface unit 80 includes a new device EEPROM 82, which is a 1-bit store that is set to one when the device is built. When the new device seek line is asserted, this bit (on a new device) will assert the new device found line. The device interface unit 80 also includes an address decoder 84. If the new device EEPROM bit is set, it will allow the address passed on the new address line to be placed in the n-bit address EEPROM 86 and then clear the new device EEPROM 82. Once the new device EEPROM 82 has been cleared, it will only pass addresses to the AND gate 72 that tests to see if the device is being asked for its state. The device interface unit 80 further includes a control word decoder 88, which reads the serial bits off of the control line. If the address matches the address in the address EEPROM, the control bits output to the device controller to change its state. It is reset via internal logic that counts the assertion of the new device seek line and resets every n+m clock cycles. The device interface unit 80 further includes the n-bit address EEPROM 86, which stores the address of the device and constantly outputs it, an m-bit state register 90, which holds the current state of the device and has an output enable line that allows it to output its value, and an address encoder 92, which accepts an n-bit address and an m-bit state and outputs them (e.g., serially) on the device state line.

The device interface unit 80 is designed to listen for the following assertions: New Device Seek, New Address, State Enable, and Control Line. The unit determines whether or not it has any work to do as a result of any such assertion. If so, it may assert any of the following back to the caller: New Device Found and Current State of the Device. When a device is attached to the bus, its value for the new device EEPROM 82 is set to '1'. This indicates that it has not yet been incorporated into the system. When the new device seek line is asserted, its value ('1') is passed to an AND gate 72 along with the value ('1') for the new device EEPROM 82. If it is a new device, i.e. the result of the AND is '1', the new device found line is asserted, informing the device polling unit 66 of the existence of a new device.

By default, the device interface unit 80 "listens" for a new address on the new address line. The assertion of the new device found line forces the device polling unit 66 to return the next device address. The new address is placed in the n-bit address EEPROM 86. The address decoder 84 then clears the new device EEPROM 82. The next time the device receives the new device seek line assertion, it does not assert the new device line. The device has now been assimilated. Once assimilated, the device may be polled for its state. During the polling phase of the device polling unit 66, each device is queried by its address. When queried, the device interface unit 80 recognizes its address and returns its current state. When the state enable line is asserted to the device, the address decoder 84 compares the address on the line with the device address stored in the address EEPROM 86. This comparison is performed via an AND gate 72. If the addresses match, then the request for state information is directed to this device. The positive result of the AND causes the output enable line to the state register to be asserted and the address/state encoder 92 to be enabled. The state information is sent to the address/state encoder 92. The address/state encoder 92 accepts the n-bit address and the m-bit state and outputs them serially or in parallel on the device state line(s).

If the Boolean processor 36 detects a combination of states that requires a change in another state, it will send the information over the control line. Each device interface unit accepts and reads the data from the asserted control line. The control word decoder 88 compares the incoming address to the address in the address EEPROM 86. If the addresses match, the request to make a state change is made to the current device. The control bits are then output to the device controller to initiate a change to its state.

Figure 20:
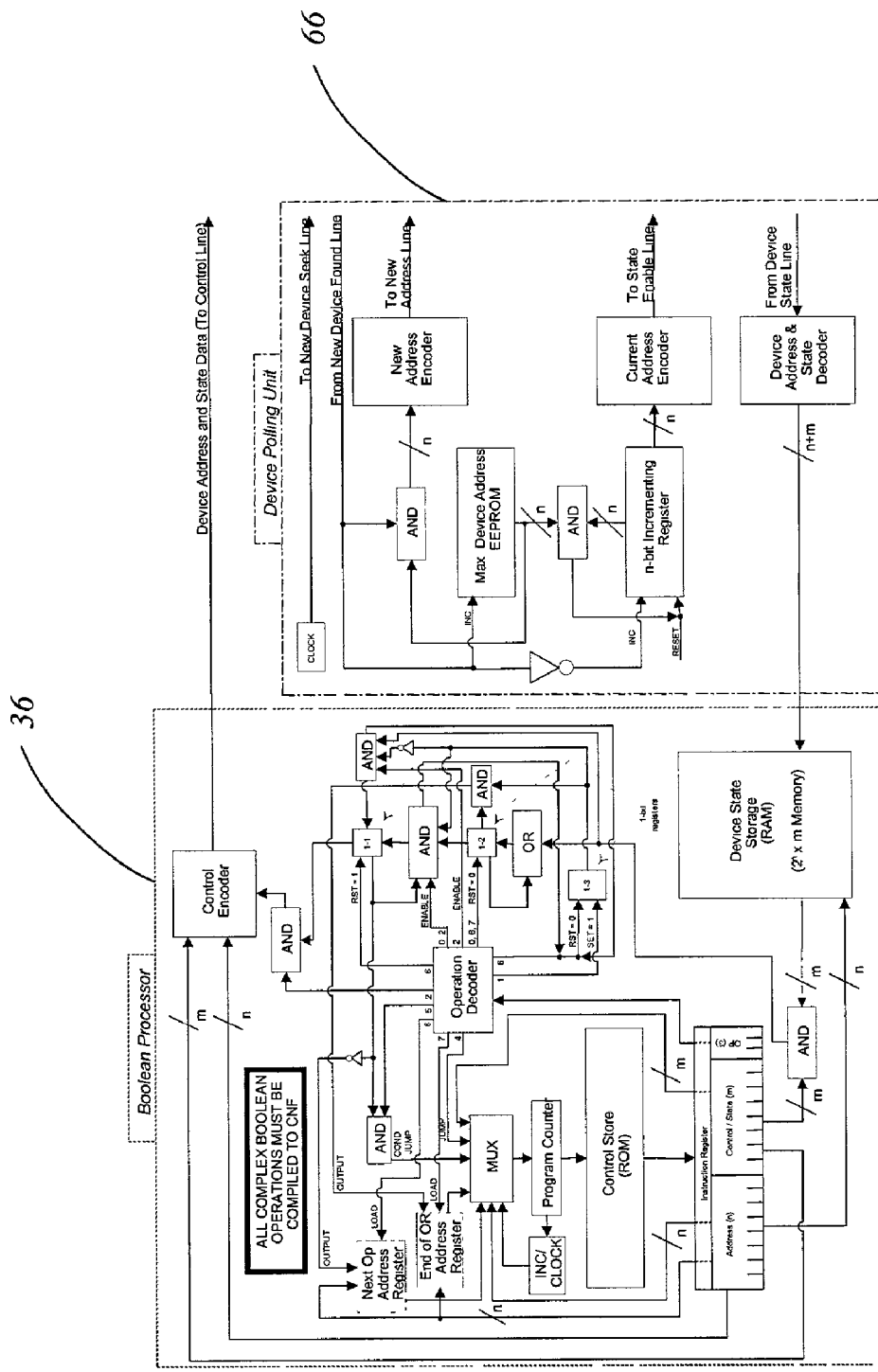
FIG. 20 is a schematic diagram of one embodiment of a system that includes the Boolean processor and the device polling unit of the present invention.
Figure 21:
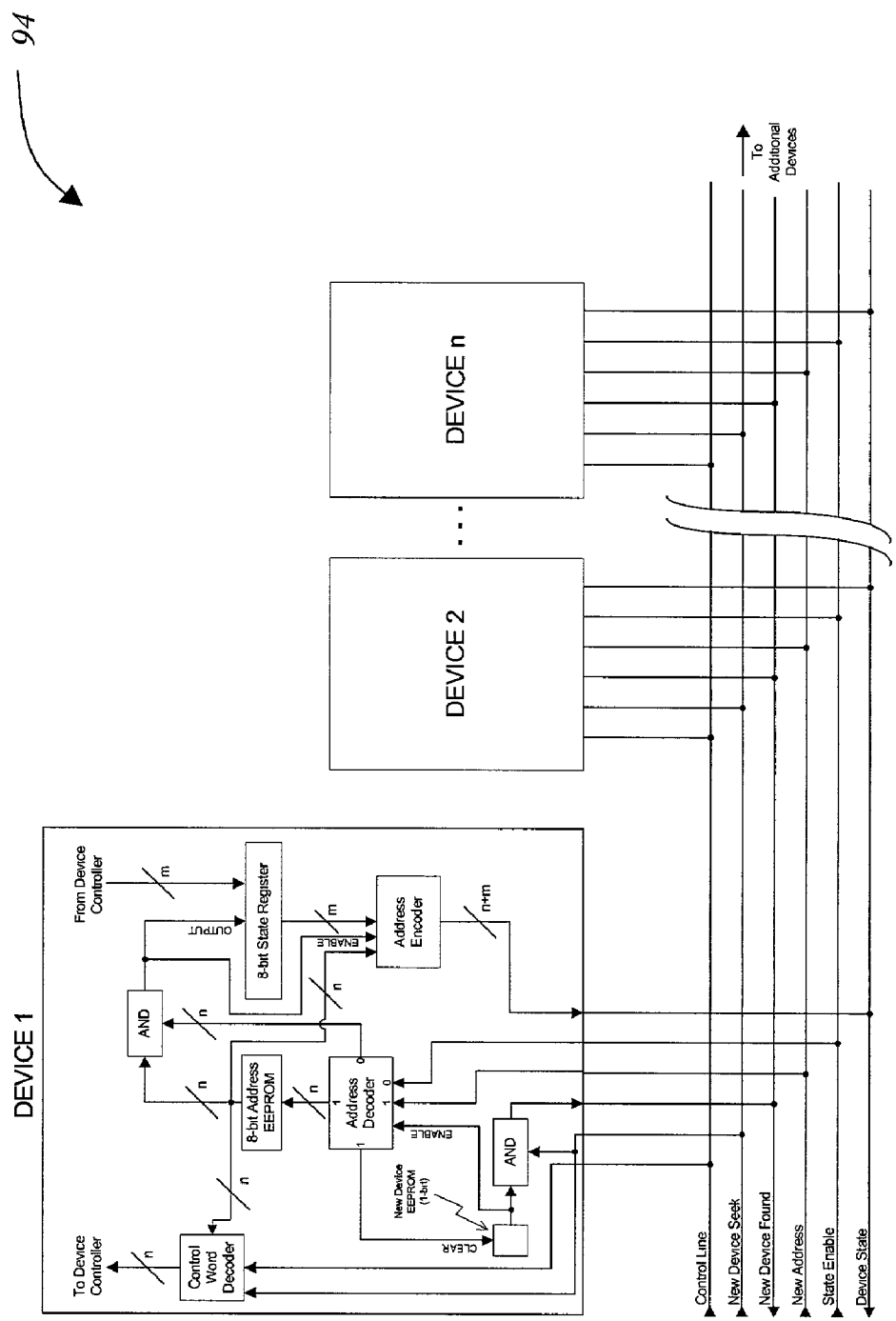
FIG. 21 is a schematic diagram of one embodiment of a system that includes the device interface unit of the present invention and n devices.

Referring to FIGS. 20 and 21, one of the advantages of having a system including the Boolean processor 36, the device polling unit 66, and a plurality of devices 94 is that the slowest operation of the system, namely the polling of devices, is decoupled from the processing performed by the Boolean processor 36. This allows the Boolean processor 36 to run at full speed, unencumbered by the relative speed of the device polling unit 66 and the device bus.

An exemplary Boolean processor-based system is a home automation/alarm system. The Boolean processor 36 monitors and controls, for example, 256 devices (n=8), each device having, for example, 256 states (m=8). The system includes, for example, a door, a window, a lamp, and a motion detector. In addition to these units, the system uses a clock, an arm/disarm unit, and a siren. Although the majority of possible device states and control words are not used in this example, the full eight bits for addressing, state reporting, and state changes are used. Each device functions as follows:

EXAMPLE 8

| | States | 8-bit value |
|---|---|---|
| Door Sensor | | |
| (System Address = 00000001) | Open | 00000000 |
| | Closed | 00000001 |
| Window Sensor | States | 8-bit value |
| (System Address = 00000010) | Open | 00000000 |
| | Closed | 00000001 |

-continued

| | | | |
|---|---|---|---|
| Motion Detector (System Address = 00000011) | States No Motion Motion Occurring | | 8-bit value 00000000 00000001 |
| Lamp (System Address = 00000100) | States Off On Control Functions Turn Off Turn On Flash Stop Flashing | | 8-bit value 00000000 00000001 8-bit value 00000000 00000001 00000010 00000011 (return to pre-flash state) |
| Clock (System Address = 00000101) | States Get Current Time | | 8-bit value Value corresponds to 10 minute increments from 00:00. |
| | (Ex: 12:30 am = 00000011; 10:10 am = 00111101) | | |
| Arm/Disarm Unit (System Address = 00000110) | States System Disarmed System Armed Control Functions Disarm System Arm System | | 8-bit value 00000000 00000001 8-bit value 00000000 00000001 |
| Siren (System Address = 00000111) | States Off On | | 8-bit value 00000000 00000001 |

In addition to the above assumptions, it is assumed that a personal computer (PC) is interfaced with the system and is used to translate code into micro-code and to load the control store. The home automation/alarm system functions as follows: At 6:00 am, disarm the alarm system; At 8:30 am, arm the alarm system; At 5:00 pm, disarm the alarm system; At 5:30 pm, turn the lamp on; At 10:30 pm, arm the alarm system; and At 10:30 pm, turn the lamp off.

If the alarm system is armed and the door or window is open, the siren sounds and the light flashes until the alarm system is disarmed. The high-level code entered into the PC is as follows:

```
10: if time=6 am then arm/disarm=disarm;
    if time=8:30 am then arm/disarm=arm;
    if time=5 pm then arm/disarm=disarm;
    if time=5:30 pm then lamp=on;
    if time=10:30 pm then arm/disarm=arm;
    if time=10:30 pm then lamp=off;
    if  arm/disarm=armed  and  (door=open  or
       window=open) then
          while arm/disarm=armed
             siren=on;
             lamp=flash;
          end while;
    goto 10;
```

The compiled micro-program for this functionality is illustrated in Table 5.

TABLE 5

Home Automation/Alarm System Micro-program

| Control Store | Instruction Register | | | |
|---|---|---|---|---|
| Address | Address | Control/State | Opcode | Functionality |
| 00000000 | 00000011 | 00000000 | 110 | Start of Boolean expr. |
| 00000001 | 00000101 | 00100100 | 000 | Time = 6 am? (AND) |
| 00000010 | 00000110 | 00000000 | 010 | Disarm system if TRUE. |

TABLE 5-continued

Home Automation/Alarm System Micro-program

| Control Store | Instruction Register | | | |
|---|---|---|---|---|
| Address | Address | Control/State | Opcode | Functionality |
| 00000011 | 00000110 | 00000000 | 110 | Start of Boolean expr. |
| 00000100 | 00000101 | 00110011 | 000 | Time = 8:30 am? (AND) |
| 00000101 | 00000110 | 00000001 | 010 | Arm system if TRUE |
| 00000110 | 00001001 | 00000000 | 110 | Start of Boolean expr. |
| 00000111 | 00000101 | 01100110 | 000 | Time = 5 pm? (AND) |
| 00001000 | 00000110 | 00000000 | 010 | Disarm system if TRUE |
| 00001001 | 00001100 | 00000000 | 110 | Start of Boolean expr. |
| 00001010 | 00000101 | 01101001 | 000 | Time = 5:30 pm? (AND) |
| 00001011 | 00000100 | 00000001 | 010 | Turn lamp on if TRUE |
| 00001100 | 00001111 | 00000000 | 110 | Start of Boolean expr. |
| 00001101 | 00000101 | 10000111 | 000 | Time = 10:30 pm? (AND) |
| 00001110 | 00000110 | 00000001 | 010 | Arm System if TRUE |
| 00001111 | 00010010 | 00000000 | 110 | Start of Boolean expr. |
| 00010001 | 00000101 | 10000111 | 000 | Time = 10:30 pm? (AND) |
| 00010001 | 00000100 | 00000000 | 010 | Turn lamp off if TRUE |
| 00010010 | 00011001 | 00000000 | 110 | Start of Boolean expr. |
| 00010011 | 00000110 | 00000001 | 000 | System Armed? (AND) |
| 00010100 | 00010111 | 00000000 | 111 | Start of Conjunct |
| 00010101 | 00000001 | 00000000 | 001 | Door Open? (OR) |
| 00010110 | 00000100 | 0000000 | 001 | Window Open? (OR) |
| 00010111 | 00000111 | 00000001 | 010 | Turn Siren on if TRUE |
| 00011000 | 00000100 | 00000010 | 010 | Flash lamp if TRUE |
| 00011001 | 00011101 | 00000000 | 110 | Start of Boolean expr. |
| 00011010 | 00000110 | 00000000 | 000 | System Disarmed? (AND) |
| 00011011 | 00000111 | 00000000 | 010 | Turn siren off |
| 00011100 | 00000100 | 00000011 | 010 | Stop flashing lamp |
| 00011101 | 00000000 | 00000000 | 100 | Loop to beginning of control store |

With regard to the present invention, it is apparent that there has been provided a Boolean processor. The architecture of the Boolean processor is optimized for monitoring and automation applications. The relatively small instruction set and design of the Boolean processor provide an instruction savings of up to about 87.5% in relation to typical microprocessor and microcontroller instruction sets. These instruction savings and simple design provide the Boolean processor with high speed, in terms of instruction, as compared to other general-purpose architectures performing similar function. In addition to efficiency, the architecture of the Boolean processor is scalable. For example, if the Boolean processor is built with 32-bit addresses and 32-bit states, it can handle over about 4 billion ($2^{32}$) devices, each with over about 4 billion possible states. The speed and scalability of the architecture of the Boolean processor make it a good candidate for large, critical applications, such as aeronautical and automotive monitoring, control, and automation applications.

As the number of sensors, or devices, increases, so does the amount of wiring required for communications. Thus, serial communications may be used with the Boolean processor. Another advantage of the architecture of the Boolean processor is that it may be fitted with either a parallel or serial communications bus. A plurality of systems can also be used, each employing a Boolean processor designed to handle a large number of sensors or devices specific to the given system. The individual systems can communicate via another, smaller Boolean processor that is linked to each of the systems as one of their devices. The smaller Boolean processor handles interactions among the systems. For example, consider a braking system and a speedometer system in an automobile. The braking system can be outfitted with numerous devices and sensors to control the application of the brakes, monitor temperature, and monitor pad wear, to name a few. Other systems in the car may only need to know whether or not the brakes are being applied and whether or not there is a problem with the entire braking system. The speedometer system can also be outfitted with numerous devices and sensors for monitoring its own health. Like the braking system, it only needs to communicate speed and generic warnings to the other systems in the car. Because each device only needs to communicate two states, a smaller Boolean processor with a smaller bus that controls the interaction between these systems can be used, thereby saving wiring weight and confining complex communications infrastructure to small areas of the vehicle.

Another potential use for the Boolean processor is as an interrupt controller. A Boolean processor-based controller can enable a microprocessor to be interrupted by an almost limitless number of devices. The Boolean processor acts as an "interrupt broker" for the devices attached to it.

Although the Boolean processor of the present invention has been described and illustrated with reference to preferred embodiments and examples thereof, other embodiments and examples may be used and the following claims are intended to cover all such equivalents.

What is claimed is:

1. A processor, comprising:
    a Boolean logic unit formed in a static circuit with a static data path, wherein the Boolean logic unit is operated for dynamically performing the short-circuit evaluation of a Conjunctive Normal Form Boolean expressions/operations in an instruction store without further compilation or optimization of the expression by the Boolean Logic Unit;
    a plurality of input/output interfaces, wherein the plurality of input/output interfaces are operated for receiving a plurality of compiled Boolean expressions/operations and transmitting a plurality of compiled results; and
    a plurality of registers, wherein the plurality of registers includes:
        a first register for storing the outcome of the most recently evaluated intra-conjunct term,
        a second register for storing the outcome of the most recently evaluated conjunct,
        an instruction register,
        a next operation address register, and
        an end of OR address register,
    wherein the short-circuit evaluation comprises halting the evaluation of at least a portion of the Conjunctive Normal Form expression/operation if the outcome of the portion becomes known based on an outcome of an evaluation of a prior portion of the Conjunctive Normal Form expression/operation by the Boolean Logic Unit,
    wherein the value of the outcome of the prior portion is maintained by the first and second registers, and
    wherein the value of the first register will change to a value other than its default value during an intra-conjunct short-circuit operation and force the immediate evaluation of the next conjunct within the current Cognitive Normal Form expression/operation and forego the evaluation of the remaining terms of the current conjunct if remaining terms exist and the value of the second register will change to a value other than its default value during an inter-conjunct short-circuit operation and forego the evaluation of the remaining portion of the current expression and force the immediate evaluation of the next Conjunctive Normal Form expression to be evaluated if any remaining Conjunctive Normal Form expressions exist within the instruction store.

2. The processor of claim 1, wherein the results of all AND computations in the evaluation of the Conjunctive Normal Form Boolean expression/operation are stored and represented by an n-bit AND operation register, wherein the n-bit AND operation register is operable for storing the composite results of all conjuncts that have been evaluated at any given point in time during the evaluation of a Conjunctive Normal Form Boolean expression/operation.

3. The processor of claim 2, wherein the n-bit AND operation register is initialized to a default value.

4. The processor of claim 2, wherein the n-bit AND operation register initializes to its default value after the start of an operational code.

5. The processor of claim 2, wherein the n-bit AND operation register remains at its default value if all of the conjuncts of a Boolean expression/operation being evaluated are true.

6. The processor of claim 2, wherein the Conjunctive Normal Form Boolean expression/operation is false if the n-bit AND operation register is set to any value other than its default value, and the remainder of the Boolean expression/operation is short-circuited.

7. The processor of claim 1, wherein the results of all OR computations in the evaluation of a Conjunctive Normal Form Boolean expression/operation are stored and represented by an n-bit OR operation register, wherein the n-bit OR operation register is operable for storing the composite results of all terms that have been evaluated at any given point in time during the evaluation of those terms within any given conjunct in a Conjunctive Normal Form Boolean expression/operation.

8. The processor of claim 7, wherein the n-bit OR operation register initializes to a default value and remains in that state until a term in a predetermined conjunct evaluates to true.

9. The processor of claim 8, further comprising an n-bit OR conjunct register, wherein the n-bit OR conjunct register indicates that the evaluation of a conjunct comprising an OR clause has begun.

10. The processor of claim 9, wherein the n-bit OR conjunct register initializes to a default value and remains in that state until an expression/operation sets its value to a value other than the default value.

11. The processor of claim 9, wherein a predetermined conjunct evaluates to true if the n-bit OR register is set to a value other than its default value and the n-bit OR conjunct register is set to a value other than its default value, and the processor short-circuits to the stan of the next conjunct to be evaluated.

12. The processor of claim 1, further comprising an operation decoder, wherein the operation decoder is operable for deciphering an operational code and controlling units that are dependent upon the operational code.

13. The processor of claim 12, wherein functions of the operation decoder comprise Boolean AND, Boolean OR, end of operation, no operation, unconditional jump, conditional jump, start of operation, and start of conjunct.

14. The processor of claim 1, further comprising a control encoder, wherein the control encoder accepts n+m bits in parallel and outputs them across a device bus either in series or in parallel.

15. The processor of claim 1, further comprising a random-access memory, wherein the random-access memory is operable for storing the states of a plurality of devices that the processor monitors and controls.

16. The processor of claim 1, further comprising a memory, wherein the memory is operable for holding a compiled micro-program.

17. The processor of claim 16, further comprising a program counter, wherein the program counter is operable for fetching an instruction from the read-only memory.

18. The processor of claim 17, further comprising a memory device, wherein the memory device is operable for configuring the program counter for normal operation, unconditional jump operation, conditional jump operation, and Boolean short-circuit operation.

19. The processor of claim 1, wherein the plurality of registers comprise a plurality of multi-bit registers.

20. The processor of claim 19, wherein the plurality of multi-bit registers comprise an instruction register, a next operation address register, and an end of OR address register.

21. The processor of claim 20, wherein the instruction register comprises an n+m+x-bit wide register comprising an n-bit address, an m-bit control/state word, and an x-bit operational code.

22. The processor of claim 20, wherein the next operation register stores an address used for Boolean short-circuiting.

23. The processor of claim 20, wherein the end of OR address register stores the address of an instruction immediately following a conjunct comprising an OR clause.

24. The processor of claim 1, wherein the plurality of registers comprise a plurality of single-bit registers.

25. The processor of claim 24, wherein the plurality of single-bit registers comprise an AND operation register, an OR operation register, and an indicator for conjuncts comprising OR clauses.

* * * * *

UNITED STATES PATENT AND TRADEMARK OFFICE
CERTIFICATE OF CORRECTION

PATENT NO. : 7,360,066 B2  Page 1 of 1
APPLICATION NO. : 10/075917
DATED : April 15, 2008
INVENTOR(S) : Kenneth Elmon Koch III It is certified that error appears in the above-identified patent and that said Letters Patent is hereby corrected as shown below:

Title page, under item (56),
References Cited, Other Publications, that portion reading "web page at http://citeseer.isl.pus.edu/cache/papers/cs/26511/http:zSzzSzwww.cs.wm.eduzSz-ciadozSzpubszSz1999ICATPN-MDD.pdf/miner99efficient.pdf" should read -- web page at http://citeseer.isl.pus.edu/cache/papers/cs/26511/http:zSzzSzwww.cs.wm.eduzSz-ciardozSzpubszSz1999ICATPN-MDD.pdf/miner99efficient.pdf --

References Cited, Other Publications, that portion reading "Posegga, J. et al., "Towards First-Order Deduction Based on Shannon Graphs." Universitat Karisruhe, Insitut fur Logik, Komplexitat und Deduktionssysteme; webe page at http://citeseer.isl.psu.edu.cache/papers/cs/24059/http:zSzzSzwww.sdsc.eduzSz-ludaeschzSzPaperzSzgwai92.pdf/posegga92towards.pdf" should read -- Posegga, J. et al., "Towards First-Order Deduction Based on Shannon Graphs." Universitat Karlsruhe, Institut fur Logik, Komplexitat und Deduktionssysteme; webe page at http://citeseer.ist.psu.edu.cache/papers/cs/24059/http:zSzzSzwww.sdsc.eduzSz-ludaeschzSzPaperzSzgwai92.pdf/posegga92towards.pdf --

Signed and Sealed this

Fifth Day of August, 2008

JON W. DUDAS
*Director of the United States Patent and Trademark Office*